(12) United States Patent
Chang et al.

(10) Patent No.: US 10,637,794 B2
(45) Date of Patent: Apr. 28, 2020

(54) RESOURCE SUBSCRIPTION METHOD, RESOURCE SUBSCRIPTION APPARATUS, AND RESOURCE SUBSCRIPTION SYSTEM

(71) Applicant: Huawei Technologies Co., Ltd., Shenzhen (CN)

(72) Inventors: Hongna Chang, Xi'an (CN); Lu Gan, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/193,574

(22) Filed: Nov. 16, 2018

(65) Prior Publication Data

US 2019/0089648 A1     Mar. 21, 2019

Related U.S. Application Data

(63) Continuation of application No. PCT/CN2017/083508, filed on May 8, 2017.

(30) Foreign Application Priority Data

May 19, 2016  (CN) .......................... 2016 1 0338540
Apr. 24, 2017  (CN) .......................... 2017 1 0272801

(51) Int. Cl.
*G06F 15/173* (2006.01)
*H04L 12/911* (2013.01)
*H04L 29/08* (2006.01)

(52) U.S. Cl.
CPC .............. *H04L 47/72* (2013.01); *H04L 67/10* (2013.01); *H04L 67/12* (2013.01); *H04L 67/146* (2013.01);

(Continued)

(58) Field of Classification Search
CPC . H04L 47/72; H04L 67/2809; H04L 67/2842; H04L 67/12; H04L 67/2876;
(Continued)

(56) References Cited

U.S. PATENT DOCUMENTS 8,126,986 B2 * 2/2012 Decasper ............ G06F 16/9574
                                                    709/217
2002/0059526 A1 * 5/2002 Dillon ................ H04B 7/18584
                                                    709/226

(Continued)

FOREIGN PATENT DOCUMENTS

CN     101034997 A    9/2007
CN     101043345 A    9/2007

(Continued)

OTHER PUBLICATIONS

Parkitny et al.,"A Comparative Study of Pub/Sub Methods in Structured P2P Networks," XP02790070 (Sep. 27, 2006).
CN/201710272801.7, Office Action, dated Dec. 11, 2019.

*Primary Examiner* — Richard G Keehn
(74) *Attorney, Agent, or Firm* — Leydig, Voit & Mayer, Ltd.

(57) ABSTRACT

A network resource subscription system is provided. In the system, a subscription apparatus and a publishing apparatus respectively send a resource subscription request and a resource publishing request to a control apparatus through a forwarding apparatus, to establish a network resource tree. Then, the control apparatus can use a relatively exact or fuzzy matching manner to make the subscription apparatus subscribe to a resource of the publishing apparatus, and make the subscription apparatus and the publishing apparatus perform peer to peer (P2P) communication, thereby taking both transmission efficiency and subscription efficiency into account.

20 Claims, 12 Drawing Sheets

(52) U.S. Cl.
CPC .......... *H04L 67/16* (2013.01); *H04L 67/2809* (2013.01); *H04L 67/2842* (2013.01); *H04L 67/325* (2013.01); *H04L 67/327* (2013.01); *H04L 67/2876* (2013.01)

(58) Field of Classification Search
CPC ..... H04L 67/146; H04L 67/16; H04L 67/325; H04L 67/10; H04L 67/327
See application file for complete search history.

(56) References Cited

U.S. PATENT DOCUMENTS

| | | | |
|---|---|---|---|
| 2007/0180135 A1* | 8/2007 | Kenrick | H04L 29/06027 709/231 |
| 2007/0237139 A1 | 10/2007 | Garcia-Martin et al. | |
| 2011/0302323 A1* | 12/2011 | Fisk | G06Q 10/00 709/246 |
| 2012/0127851 A1* | 5/2012 | Le Rouzic | H04L 65/1073 370/216 |
| 2014/0006951 A1* | 1/2014 | Hunter | H04H 60/31 715/719 |
| 2015/0074259 A1* | 3/2015 | Ansari | H04L 67/02 709/224 |
| 2016/0219125 A1 | 7/2016 | Xiao | |
| 2017/0046366 A1 | 2/2017 | Rahman et al. | |
| 2017/0118537 A1* | 4/2017 | Stransky-Heilkron | G06F 21/16 |
| 2017/0195335 A1* | 7/2017 | Kurian | H04L 63/102 |
| 2017/0208139 A1 | 7/2017 | Li et al. | |
| 2018/0213378 A1 | 7/2018 | Brown et al. | |

FOREIGN PATENT DOCUMENTS

| | | |
|---|---|---|
| CN | 101047618 A | 10/2007 |
| CN | 201138807 Y | 10/2008 |
| CN | 101399776 A | 4/2009 |
| CN | 101834853 A | 9/2010 |
| CN | 102130801 A | 7/2011 |
| CN | 102546225 A | 7/2012 |
| CN | 103412883 A | 11/2013 |
| CN | 104468838 A | 3/2015 |
| JP | 2017516213 A | 6/2017 |
| JP | 2017523519 A | 8/2017 |
| JP | 2017525042 A | 8/2017 |
| WO | 2015081786 A1 | 6/2015 |
| WO | 2016014516 A1 | 1/2016 |

* cited by examiner

RESOURCE SUBSCRIPTION METHOD, RESOURCE SUBSCRIPTION APPARATUS, AND RESOURCE SUBSCRIPTION SYSTEM

CROSS-REFERENCE TO RELATED APPLICATIONS

This application is a continuation of International Application No. PCT/CN2017/083508, filed on May 8, 2017, which claims priority to Chinese Patent Application No. 201610338540.X, filed on May 19, 2016, and Chinese Patent Application No. 201710272801.7, filed on Apr. 24, 2017. The disclosures of the aforementioned applications are hereby incorporated by reference in their entireties.

TECHNICAL FIELD

The present disclosure relates to communications technologies, and in particular, to a resource subscription method, a resource subscription apparatus, and a resource subscription system.

BACKGROUND

REST (Representational State Transfer) describes a network system in an architectural style, for example, a web application program. In a RESTful architecture, each entity or each piece of information is a resource, and may be a piece of text, a picture, a song, a service, or the like. Each resource corresponds to a specific URL (Uniform Resource Locator), and the resource is obtained by accessing a URI of the resource. A RESTful system usually uses a client/server mode, and nodes transmit data to each other in a hop-by-hop addressing manner based on a URL of a resource.

Currently, some Internet of Things systems use the RESTful architecture. A device is connected to a cloud platform directly or through a gateway, and data generated by the device is reported to the platform in a form of resource. However, on the industrial Internet of Things, each device publishes tens of thousands of pieces of data per second, and the data is reported to the cloud platform through the gateway, overloading the cloud platform and the gateway, and resulting in congestion and a packet loss. In some strict scenarios, for example, applications scenarios such as medical treatment and intelligent vehicles, there is a relatively high requirement on data for real-time quality, and delayed transmission of data may result in disastrous consequences. For example, a connection is established between an automobile self-driving system, a vehicle speed sensor, a road monitoring system, a console, a braking system, and the like. When the road monitoring system detects that a road condition is abnormal, the road condition information needs to be reported to the console in time, and the console sends a control command to the braking system based on a vehicle speed and the road condition information, for braking.

Referring to FIG. 1, FIG. 1 is an architectural diagram of an Internet of Things cloud platform 1 that is based on a RESTful architecture. The Internet of Things cloud platform 1 includes an apparatus 11, a gateway 12, a cloud platform 13, a gateway 14, and an apparatus 15. Because a client (that is, the apparatus 11)/server (that is, the apparatus 15) mode is used in communication, devices communicate with each other in a hop-by-hop addressing manner based on a URL of a resource, cross-gateway transmission requires a cloud platform to forward a message, and apparatuses cannot perform direct P2P communication with each other. For example, the apparatus 11 registers with the gateway 12, the apparatus 15 registers with the gateway 14, and the gateway 12 and the gateway 14 register with the cloud platform. When the apparatus 11 needs to send a message to the apparatus 15, the apparatus 11 first sends the message to the gateway 12. The gateway 12 obtains URL information of the apparatus 15 from the message, and forwards the message to the cloud platform if a URL of the apparatus 15 cannot be found in local registration information. The cloud platform parses the URL of the apparatus 15 in the message, and forwards the message to the gateway 14 when discovering, in local registration information, that the gateway 14 has the URL resource, and the gateway 14 forwards the message to the apparatus 15. However, a disadvantage of the Internet of Things cloud platform 1 that is based on the RESTful architecture is that the apparatus 11 and the apparatus 15 cannot perform direct P2P communication with each other, increasing a message transmission delay.

Therefore, how to provide a resource subscription system having high transmission efficiency is still a problem that needs to be addressed in the field.

SUMMARY

An objective of the present disclosure is to provide a resource subscription system having high transmission efficiency.

To achieve the foregoing objective, a first aspect of the present disclosure provides a resource subscription system, where the system includes: a publishing apparatus, configured to send a resource publishing request, where the resource publishing request includes information about a to-be-published resource, node identification information of the publishing apparatus, an IP address of the publishing apparatus, and node identification information of a control apparatus; a first forwarding apparatus, configured to: receive the resource publishing request, add node identification information of the first forwarding apparatus to the resource publishing request, and send the resource publishing request to the control apparatus based on the node identification information of the control apparatus in the resource publishing request; and the control apparatus, configured to: receive the resource publishing request, determine path information of the publishing apparatus based on the node identification information of the first forwarding apparatus and the node identification information of the publishing apparatus in the resource publishing request, and store the path information, the information about a to-be-published resource, and the IP address of the publishing apparatus in a publishing aapparatus node of a network resource tree.

With reference to the first aspect, in a first possible implementation, the resource subscription system further includes: a subscription apparatus, configured to send a resource subscription request, where the resource subscription request includes information about a to-be-subscribed resource, node identification information of the subscription apparatus, an IP address of the subscription apparatus, and the node identification information of the control apparatus; and a second forwarding apparatus, configured to: receive the resource subscription request, add node identification information of the second forwarding apparatus to the resource subscription request, and send the resource subscription request to the control apparatus based on the node identification information of the control apparatus in the resource subscription request, where the control apparatus is further configured to: receive the resource subscription request, determine path information of the subscription apparatus based on the node identification information of the second forwarding apparatus and the node identification information of the subscription apparatus in the resource subscription request, and store the path information, the information about a to-be-subscribed resource, and the IP address of the subscription apparatus in a subscription apparatus node of the network resource tree; and the control apparatus is further configured to: perform matching in the network resource tree based on the information about a to-be-subscribed resource, and after corresponding information about a to-be-published resource is found, send the IP address of the subscription apparatus to a publishing apparatus corresponding to the information about a to-be-published resource.

With reference to the first implementation, in a second possible implementation, the information about a to-be-subscribed resource includes a resource ID, and the control apparatus is further configured to perform matching of a resource ID of the information about a to-be-published resource in the network resource tree based on the resource ID of the information about a to-be-subscribed resource.

With reference to the first implementation, in a third possible implementation, the information about a to-be-subscribed resource includes node identification information of an apparatus, and the control apparatus is further configured to: perform, based on the node identification information, matching in the path information stored in a resource publishing node of the network resource tree, and when a node identifier of the first forwarding apparatus is found, subscribe to a resource published by a publishing apparatus subordinate to the first forwarding apparatus.

With reference to the first implementation, in a fourth possible implementation, the information about a to-be-subscribed resource includes a resource type, and the control apparatus is further configured to perform matching in the network resource tree based on the resource type, to find a publishing apparatus node including the resource type.

With reference to the first implementation, in a fifth possible implementation, after the publishing apparatus node is established, the control apparatus is further configured to: search for the information about a to-be-subscribed resource that matches the information about a to-be-published resource, so as to find the subscription apparatus node in the network resource tree; store the IP address of the subscription apparatus in the publishing apparatus node; and send the IP address of the subscription apparatus to the publishing apparatus, to involve the publishing apparatus in resource subscription of the subscription apparatus, or in other words to enable the publishing apparatus publish resource to the subscription apparatus.

With reference to the first implementation, in a sixth possible implementation, the control apparatus sends the IP address of the subscription apparatus to the publishing apparatus based on either the path information or the IP address of the publishing apparatus.

To achieve the foregoing objective, a second aspect of the present disclosure provides a resource subscription method, where the resource subscription method includes: sending, by the publishing apparatus, a resource publishing request, where the resource publishing request includes information about a to-be-published resource, node identification information of the publishing apparatus, an IP address of the publishing apparatus, and node identification information of a control apparatus; receiving, by the first forwarding apparatus, the resource publishing request, adding node identification information of the first forwarding apparatus to the resource publishing request, and sending the resource publishing request to the control apparatus based on the node identification information of the control apparatus in the resource publishing request; and receiving, by the control apparatus, the resource publishing request, determining path information of the publishing apparatus based on the node identification information of the first forwarding apparatus and the node identification information of the publishing apparatus in the resource publishing request, and storing the path information, the information about a to-be-published resource, and the IP address of the publishing apparatus in a publishing apparatus node of a network resource tree.

With reference to the second aspect, in a first possible implementation, the resource subscription method further includes: sending, by a subscription apparatus, a resource subscription request, where the resource subscription request includes information about a to-be-subscribed resource, node identification information of the subscription apparatus, an IP address of the subscription apparatus, and the node identification information of the control apparatus; receiving, by a second forwarding apparatus, the resource subscription request; adding, by the second forwarding apparatus, node identification information of the second forwarding apparatus to the resource subscription request; sending, by the second forwarding apparatus, the resource subscription request to the control apparatus based on the node identification information of the control apparatus in the resource subscription request; receiving, by the control apparatus, the resource subscription request; determining, by the control apparatus, path information of the subscription apparatus based on the node identification information of the second forwarding apparatus and the node identification information of the subscription apparatus in the resource subscription request; storing, by the control apparatus, the path information, the information about a to-be-subscribed resource, and the IP address of the subscription apparatus in a subscription apparatus node of the network resource tree; performing, by the control apparatus, matching in the network resource tree based on the information about a to-be-subscribed resource; and after corresponding information about a to-be-published resource is found, sending, by the control apparatus, the IP address of the subscription apparatus to a publishing apparatus corresponding to the information about a to-be-published resource.

With reference to the first implementation, in a second possible implementation, the information about a to-be-subscribed resource includes a resource ID, and the resource subscription method further includes: performing, by the control apparatus, matching of a resource ID of the information about a to-be-published resource in the network resource tree based on the resource ID of the information about a to-be-subscribed resource.

With reference to the first implementation, in a third possible implementation, the information about a to-be-subscribed resource includes node identification information of an apparatus, and the resource subscription method further includes: performing, by the control apparatus based on the node identification information, matching in the path information stored in a resource publishing node of the network resource tree, and when a node identifier of the first forwarding apparatus is found, subscribing to a resource published by a publishing apparatus subordinate to the first forwarding apparatus.

With reference to the first implementation, in a fourth possible implementation, the information about a to-be-subscribed resource includes a resource type, and the resource subscription method further includes: performing, by the control apparatus, matching in the network resource tree based on the resource type, to find a publishing apparatus node including the resource type.

With reference to the first implementation, in a fifth possible implementation, after the publishing apparatus node is established, the resource subscription method further includes: finding, by the control apparatus, the information about a to-be-subscribed resource that matches the information about a to-be-published resource, so as to find the subscription apparatus node in the network resource tree; storing, by the control apparatus, the IP address of the subscription apparatus in the publishing apparatus node; and sending, by the control apparatus, the IP address of the subscription apparatus to the publishing apparatus, to enable the publishing apparatus publish resource to the subscription apparatus.

With reference to the first implementation, in a sixth possible implementation, the method further includes: sending, by the control apparatus, the IP address of the subscription apparatus to the publishing apparatus based on either the path information or the IP address of the publishing apparatus.

To achieve the foregoing objective, a third aspect of the present disclosure provides a control apparatus applied to a resource subscription system, where the resource subscription system includes a publishing apparatus and a first forwarding apparatus, the control apparatus works in coordination with the publishing apparatus and the first forwarding apparatus, the publishing apparatus exchanges information with the control apparatus through the first forwarding apparatus, and the control apparatus includes: a memory, configured to store a network resource tree; a transceiver, configured to receive a resource publishing request, where the resource publishing request includes information about a to-be-published resource, node identification information of the publishing apparatus, node identification information of the first forwarding apparatus, and an IP address of the publishing apparatus; and a processor, configured to: determine path information of the publishing apparatus based on the node identification information of the first forwarding apparatus and the node identification information of the publishing apparatus in the resource publishing request, and store the path information, the information about a to-be-published resource, and the IP address of the publishing apparatus in a publishing apparatus node of the network resource tree.

With reference to the third aspect, in a first possible implementation, the resource subscription system further includes a subscription apparatus and a second forwarding apparatus, and the transceiver is further configured to receive the resource subscription request, where the resource subscription request includes information about a to-be-subscribed resource, node identification information of the subscription apparatus, an IP address of the subscription apparatus, and node identification information of the second forwarding apparatus; the processor determines path information of the subscription apparatus based on the node identification information of the second forwarding apparatus and the node identification information of the subscription apparatus in the resource subscription request; the processor stores the path information, the information about a to-be-subscribed resource, and the IP address of the subscription apparatus in a subscription apparatus node of the network resource tree; the processor performs matching in the network resource tree based on the information about a to-be-subscribed resource; and after corresponding information about a to-be-published resource is found, the transceiver sends the IP address of the subscription apparatus to a publishing apparatus corresponding to the information about a to-be-published resource.

With reference to the first implementation, in a second possible implementation, the information about a to-be-subscribed resource includes a resource ID, and the processor of the control apparatus is further configured to perform matching of a resource ID of the information about a to-be-published resource in the network resource tree based on the resource ID of the information about a to-be-subscribed resource.

With reference to the first implementation, in a third possible implementation, the information about a to-be-subscribed resource includes node identification information of an apparatus, and the processor of the control apparatus performs, based on the node identification information, matching in the path information stored in a resource publishing node of the network resource tree, and when a node identifier of the first forwarding apparatus is found, subscribes to a resource published by a publishing apparatus subordinate to the first forwarding apparatus.

With reference to the first implementation, in a fourth possible implementation, the information about a to-be-subscribed resource includes a resource type, and the processor of the control apparatus is further configured to perform matching in the network resource tree based on the resource type, to find a publishing apparatus node including the resource type.

With reference to the first implementation, in a fifth possible implementation, after the publishing apparatus node is established, the processor is further configured to: search for the information about a to-be-subscribed resource that matches the information about a to-be-published resource, so as to find the subscription apparatus node in the network resource tree; and store the IP address of the subscription apparatus in the publishing apparatus node; and the transceiver sends the IP address of the subscription apparatus to the publishing apparatus, to enable the publishing apparatus publish resource to the subscription apparatus.

With reference to the first implementation, in a sixth possible implementation, the transceiver of the control apparatus sends the IP address of the subscription apparatus to the publishing apparatus based on either the path information or the IP address of the publishing apparatus.

To achieve the foregoing objective, a fourth aspect of the present disclosure provides a resource subscription method, where the resource subscription method includes: receiving, by a transceiver of a control apparatus, a resource publishing request, where the resource publishing request includes information about a to-be-published resource, node identification information of the publishing apparatus, node identification information of the first forwarding apparatus, and an IP address of the publishing apparatus; determining, by a processor of the control apparatus, path information of the publishing apparatus based on the node identification information of the first forwarding apparatus and the node identification information of the publishing apparatus in the resource publishing request; and storing, by the processor, the path information, the information about a to-be-published resource, and the IP address of the publishing apparatus in a publishing apparatus node of a network resource tree.

With reference to the fourth aspect, in a first possible implementation, the resource subscription method further includes: receiving, by the transceiver, a resource subscription request from a subscription apparatus, where the resource subscription request includes information about a to-be-subscribed resource, node identification information of the subscription apparatus, an IP address of the subscription apparatus, and node identification information of a second forwarding apparatus; determining, by the processor, path information of the subscription apparatus based on the node identification information of the second forwarding apparatus and the node identification information of the subscription apparatus in the resource subscription request; storing, by the processor, the path information, the information about a to-be-subscribed resource, and the IP address of the subscription apparatus in a subscription apparatus node of the network resource tree; performing, by the processor, matching in the network resource tree based on the information about a to-be-subscribed resource; and after corresponding information about a to-be-published resource is found, sending, by the transceiver, the IP address of the subscription apparatus to a publishing apparatus corresponding to the information about a to-be-published resource.

With reference to the first implementation, in a second possible implementation, the information about a to-be-subscribed resource includes a resource ID, and the resource subscription method further includes: further performing, by the processor of the control apparatus, matching of a resource ID of the information about a to-be-published resource in the network resource tree based on the resource ID of the information about a to-be-subscribed resource.

With reference to the first implementation, in a third possible implementation, the information about a to-be-subscribed resource includes node identification information of an apparatus, and the resource subscription method further includes: performing, by the processor of the control apparatus based on the node identification information, matching in the path information stored in a resource publishing node of the network resource tree, and when a node identifier of the first forwarding apparatus is found, subscribing to a resource published by a publishing apparatus subordinate to the first forwarding apparatus.

With reference to the first implementation, in a fourth possible implementation, the information about a to-be-subscribed resource includes a resource type, and the resource subscription method further includes: performing, by the processor of the control apparatus, matching in the network resource tree based on the resource type, to find a publishing apparatus node including the resource type.

With reference to the first implementation, in a fifth possible implementation, after the publishing apparatus node is established, the resource subscription method further includes: finding, by the processor, the information about a to-be-subscribed resource that matches the information about a to-be-published resource, so as to find the subscription apparatus node in the network resource tree; storing, by the processor, the IP address of the subscription apparatus in the publishing apparatus node; and sending, by the transceiver, the IP address of the subscription apparatus to the publishing apparatus, to enable the publishing apparatus publish resource to the subscription apparatus.

With reference to the first implementation, in a sixth possible implementation, the method further includes: sending, by the transceiver of the control apparatus, the IP address of the subscription apparatus to the publishing apparatus based on either the path information or the IP address of the publishing apparatus.

In the foregoing aspects and the corresponding implementations, when the first forwarding apparatus and the second forwarding apparatus register with the control apparatus, the publishing apparatus and the subscription apparatus do not need to add the node identification information of the control apparatus to the sent resource publishing request and resource subscription request, and the first forwarding apparatus and the second forwarding apparatus may send the resource publishing request and the resource subscription request to the control apparatus based on a registration relationship.

In the foregoing aspects and the corresponding implementations, when the publishing apparatus and the subscription apparatus support network autodiscovery, the subscription apparatus adds addressing information to the sent resource subscription request. The addressing information may be an IP address, a globally unique identifier, or other information used during network autodiscovery. The control apparatus sends the addressing information of the matching subscription apparatus to the publishing apparatus through the first forwarding apparatus. When the publishing apparatus discovers a subscription apparatus by using a network autodiscovery technology and obtains addressing information of the subscription apparatus by using the network autodiscovery technology, the publishing apparatus checks whether the addressing information obtained through network autodiscovery is within a range of addressing information sent by the control apparatus. Only when the addressing information obtained through network autodiscovery is within the range of the addressing information sent by the control apparatus, the publishing apparatus can establish a connection to the subscription apparatus discovered by using the network autodiscovery technology, and send a resource to the subscription apparatus.

In the foregoing aspects and the corresponding implementations, to save transmission resources, some information in the resource publishing request may be optional information, for example, the IP address of the publishing apparatus. To save storage resources, some information stored in the network resource tree by the control apparatus may also be optional information, for example, the IP address of the publishing apparatus, the information about a path of the publishing apparatus in the network resource tree, and the information about a path of the subscription apparatus in the network resource tree.

In conclusion, according to the subscription system and the subscription method in the present disclosure, the subscription apparatus and the publishing apparatus may respectively send the resource subscription request and the resource publishing request to the control apparatus through the forwarding apparatuses, to establish the network resource tree. Then, the control apparatus can use a relatively exact or fuzzy matching manner to make the subscription apparatus subscribe to a resource of the publishing apparatus, and make the subscription apparatus and the publishing apparatus perform P2P communication, thereby providing a resource subscription system having high transmission efficiency.

DESCRIPTION OF EMBODIMENTS

The following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Table 1 is a table of definitions of related acronyms/abbreviations and key terms in the following embodiments, and is used for reference.

TABLE 1

| Acronym/Abbreviation | English full name | Explanation in English |
| --- | --- | --- |
| DDS | Data Distribution Service | Data Distribution Service |
| REST | Representational State Transfer | Representational State Transfer |
| P2P | Peer to Peer | Peer-to-peer transmission |
| URI | Uniform resource identifier | Uniform resource identifier |
| URL | Uniform resource locator | Uniform resource locator |
| QoS | Quality of service | Quality of service |

Figure 1:
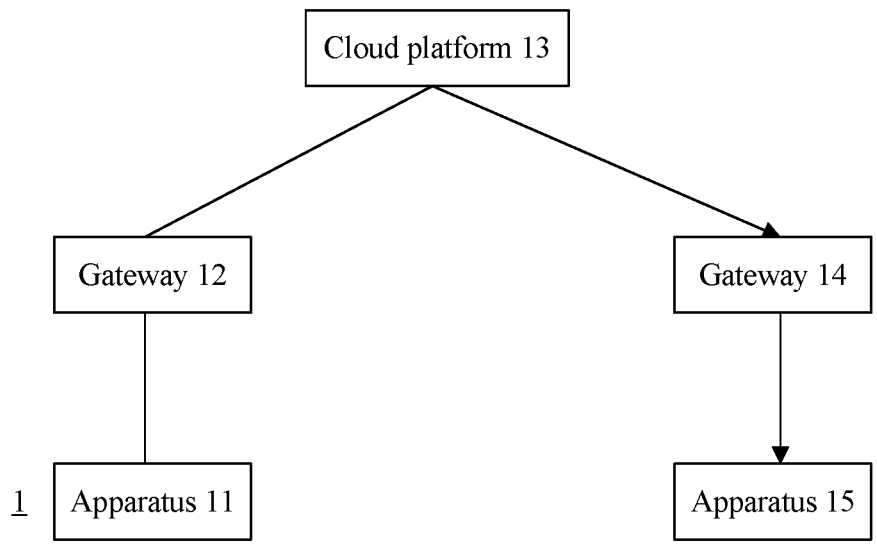
FIG. 1 is an architectural diagram of an Internet of Things cloud platform that is based on a RESTful architecture.
Figure 2:
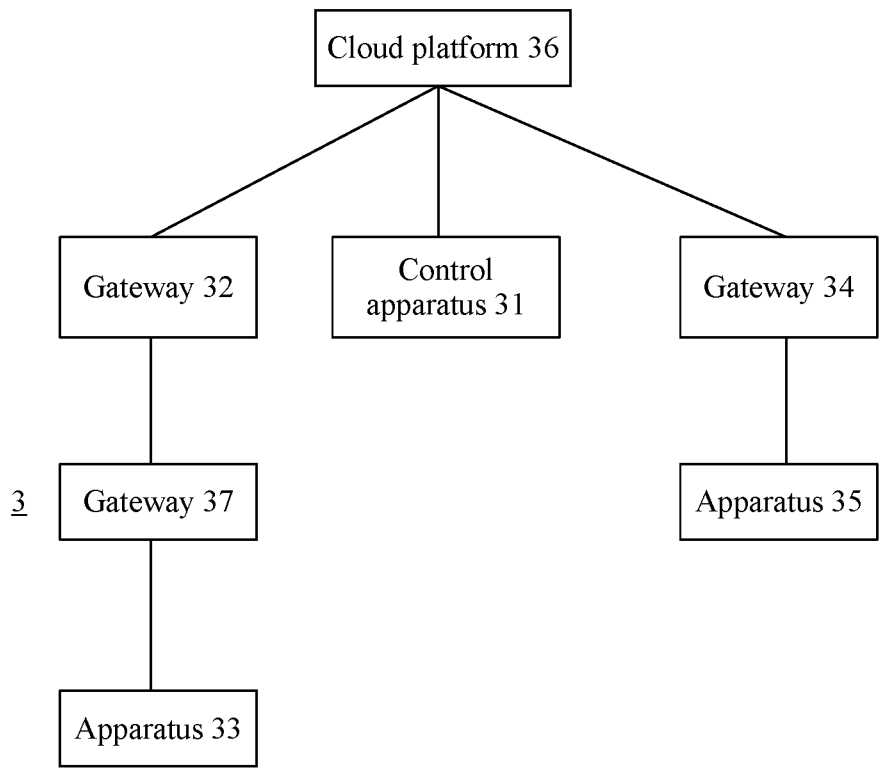
FIG. 2 is a structural diagram of a resource subscription system according to a first embodiment of the present disclosure.
Figure 3:
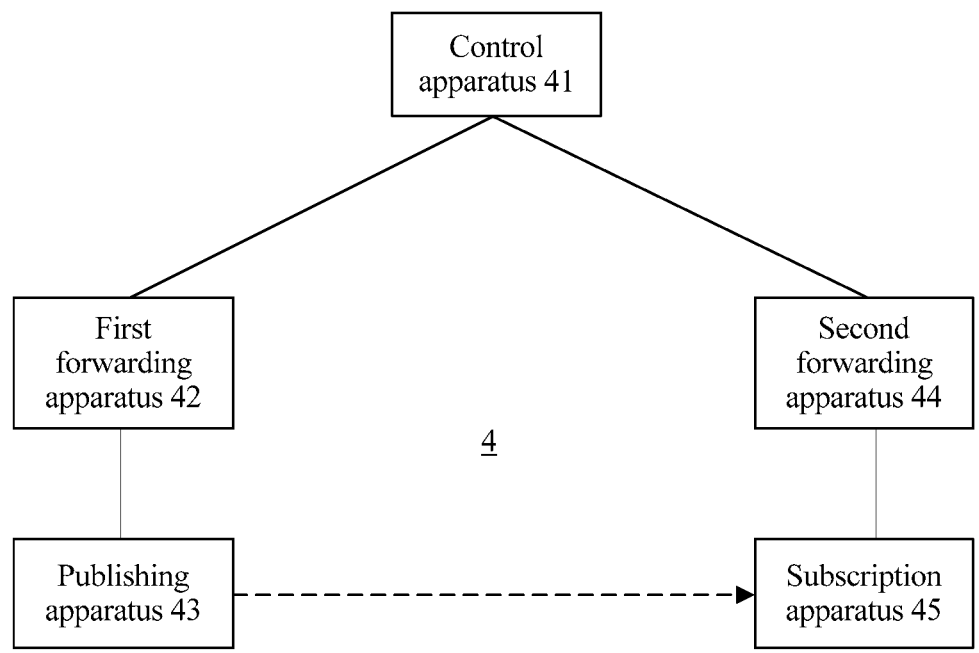
FIG. 3 is a structural diagram of a resource subscription system according to a first embodiment of the present disclosure.

FIG. 2 is a structural diagram of a resource subscription system 3 according to a first embodiment of the present disclosure. It may be learned from FIG. 2 that, the resource subscription system 3 includes a control apparatus 31, a gateway 32, an apparatus 33, a gateway 34, an apparatus 35, a cloud platform 36, and a gateway 37. The apparatus 33 may exchange information with the control apparatus 31 through the gateway 37, the gateway 32, and the cloud platform 36 in sequence. The apparatus 35 may exchange information with the control apparatus 31 through the gateway 34 and the cloud platform 36 in sequence. The apparatus 33 or the apparatus 35 may be a subscription terminal or a resource publishing terminal in the resource subscription system, for example, various intelligent terminal devices such as a sensor, a smart appliance device, a mobile phone, or a tablet computer. In the resource subscription system according to the present disclosure, the control apparatus is added to implement control and management on the resource publishing terminal and the subscription terminal, thereby implementing peer-to-peer communication between the resource publishing terminal and the subscription terminal. The added control apparatus 31 may be independent of the cloud platform 36 or may be integrated with the cloud platform. In this embodiment of the present disclosure, message processing processes of forwarding nodes are consistent. Therefore, for ease of subsequent description, all gateways or intermediate nodes on a path from the apparatus 33 or the apparatus 35 to the control apparatus 31 are collectively referred to as a forwarding apparatus. In other words, the forwarding apparatus may physically include one or more network entities. When the control apparatus 31 is independent of the cloud platform 36, forwarding apparatuses between the apparatus 33 and the control apparatus 31 include the gateway 37, the gateway 32, and the cloud platform 36. FIG. 3 is a structural diagram of a resource subscription system 4 according to the first embodiment of the present disclosure. It may be learned from FIG. 3 that, the resource subscription system 4 includes a control apparatus 41, a first forwarding apparatus 42, a publishing apparatus 43, a second forwarding apparatus 44, and a subscription apparatus 45. The publishing apparatus 43 may exchange information with the control apparatus through the first forwarding apparatus 42, and the subscription apparatus 45 may exchange information with the control apparatus 41 through the second forwarding apparatus 44.

Specifically, the publishing apparatus 43 may send, to the first forwarding apparatus 42, a resource publishing request that includes information about a to-be-published resource, node identification information of the publishing apparatus 43, an IP address of the publishing apparatus 43, and node identification information of the control apparatus 41. The first forwarding apparatus 42 may add node identification information of the first forwarding apparatus 42 to the resource publishing request, and send the resource publishing request to the control apparatus 41. The subscription apparatus 45 may send, to the second forwarding apparatus 44, a resource subscription request that includes information about a to-be-subscribed resource, node identification information of the subscription apparatus 45, an IP address of the subscription apparatus 45, and the node identification information of the control apparatus 41. The second forwarding apparatus 44 may add node identification information of the second forwarding apparatus 44 to the resource subscription request, and send the resource subscription request to the control apparatus 41. The control apparatus 41 may perform matching between the information about a to-be-subscribed resource and the information about a to-be-published resource. After the matching is completed, the subscription apparatus 45 may subscribe to a resource of the publishing apparatus 43 and perform P2P communication with the publishing apparatus 43 to obtain the resource of the publishing apparatus 43.

Figure 4:
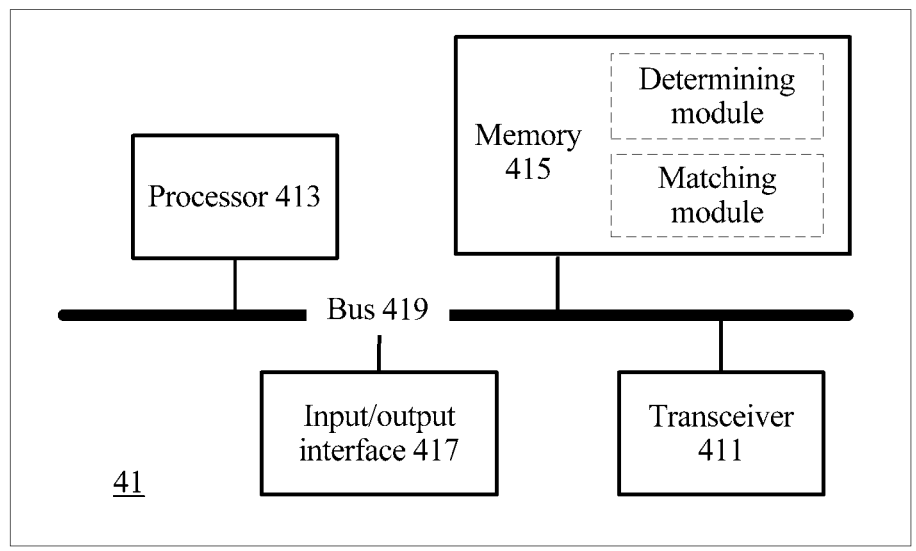
FIG. 4 is a structural diagram of a control apparatus according to a first embodiment of the present disclosure.

Referring to FIG. 4, FIG. 4 is a structural diagram of the control apparatus 41. It may be learned from FIG. 4 that, the control apparatus 41 includes a transceiver 411, a processor 413, a memory 415, an input/output interface 417, and a bus 419. A communication connection between the processor 413, the memory 415, the input/output interface 417, and the transceiver 411 is implemented by using the bus 419.

The processor 413 may use a general-purpose central processing unit (CPU), a microprocessor, an application-specific integrated circuit (ASIC), or one or more integrated circuits, and is configured to execute a corresponding program to implement the technical solutions provided in this embodiment of the present disclosure.

The memory 415 may be a read-only memory (ROM), a static storage device, a dynamic storage device, or a random access memory (RAM). The memory 415 may store an operating system or another application program. When the technical solutions provided in this embodiment of the present disclosure are implemented by using software or firmware, program code for implementing the technical solutions provided in this embodiment of the present disclosure is stored in the memory 415, and is executed by the processor 413. The memory 415 also stores a network resource tree, and the network resource tree is used to record network resource.

The input/output interface 417 is configured to: receive input data and information, and output data such as an operation result.

The transceiver 411 implements communication between the control apparatus 41 and another device or a communications network by using a transceiver apparatus including but not limited to a transceiver and a transceiver module.

The bus 419 may include a channel, to transmit information between components (for example, the processor 413, the memory 415, the transceiver 411, and the input/output interface 417) of the control apparatus 41.

It should be noted that for the control apparatus 41, only the processor 413, the memory 415, the input/output interface 417, the transceiver 411, and the bus 419 are shown in FIG. 4. However, in a specific implementation process, a person skilled in the art should understand that the control apparatus 41 further includes other components necessary for normal running. In addition, based on a specific requirement, a person skilled in the art should understand that the control apparatus 41 may further include a hardware component that implements another additional function. Furthermore, a person skilled in the art should understand that, alternatively, the control apparatus 41 may include only components or modules necessary for implementing this embodiment of the present disclosure but does not necessarily include all the components shown in FIG. 4.

A hardware structure shown in FIG. 4 and the foregoing descriptions are applicable to various forwarding apparatuses, publishing apparatuses, and subscription apparatuses provided in the embodiments of the present disclosure.

A person of ordinary skill in the art may understand that all or some of the procedures for implementing the method in the embodiment are completed by a computer program instructing related hardware. The program may be stored in a computer readable storage medium, and when the program runs, the procedures of the foregoing method embodiments may be included. The foregoing storage medium may be a magnetic disk, an optical disk, a read-only memory (ROM), a random access memory (RAM), or the like.

Figure 5:
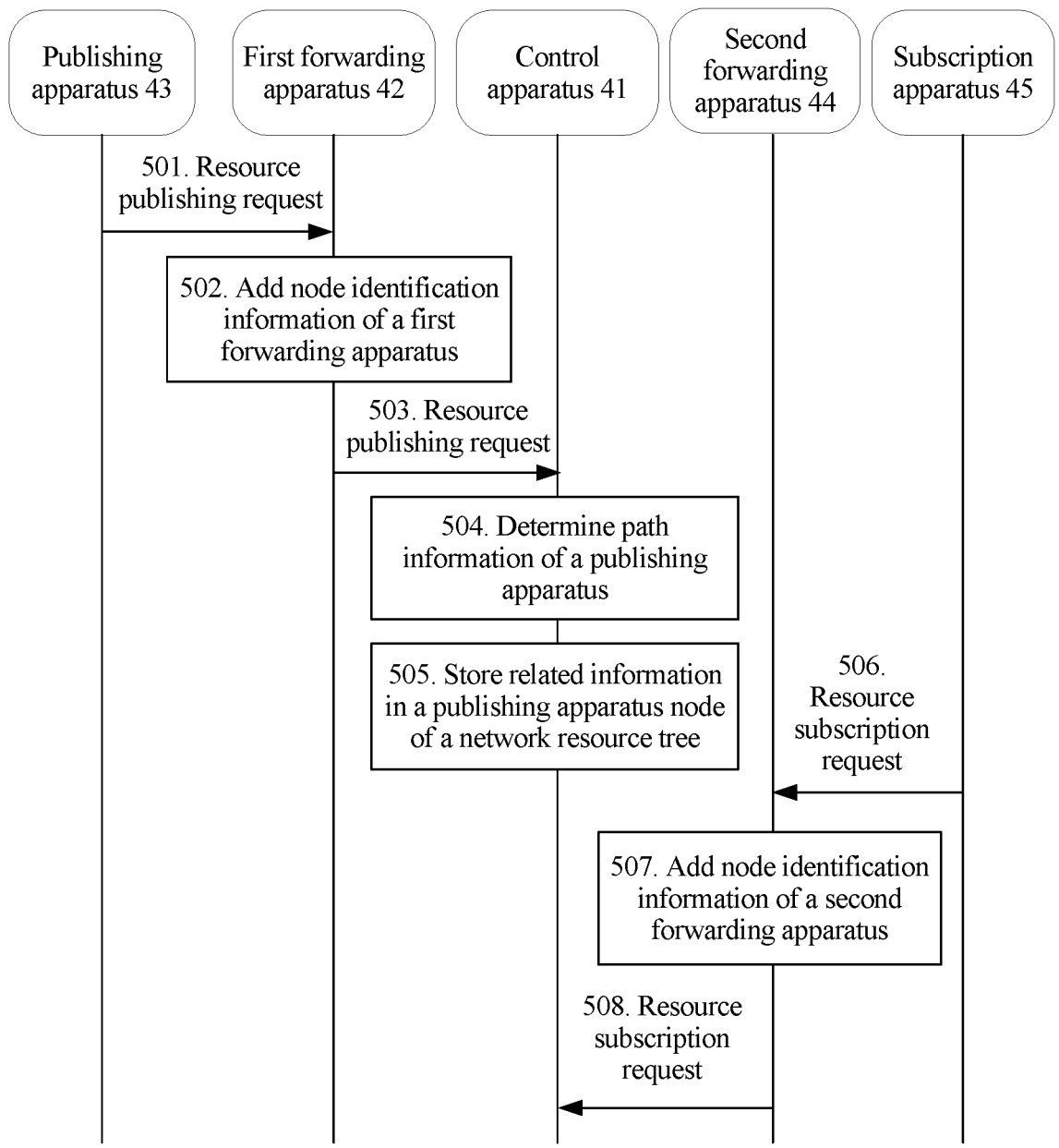
FIG. 5 is a signaling flowchart of a resource subscription system according to a first embodiment of the present disclosure.
Figure 6:
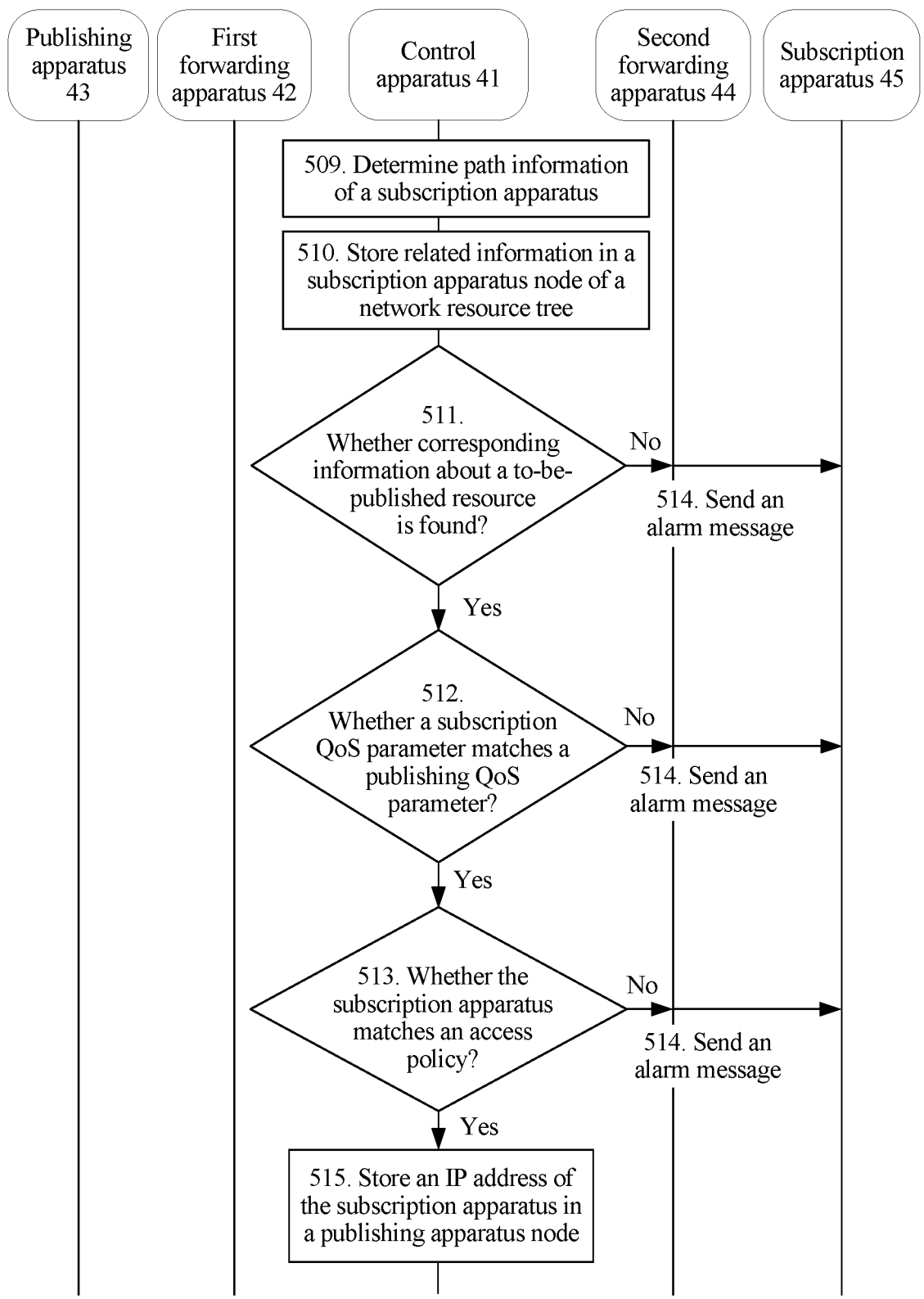
FIG. 6 is a signaling flowchart of a resource subscription system according to a first embodiment of the present disclosure.
Figure 7:
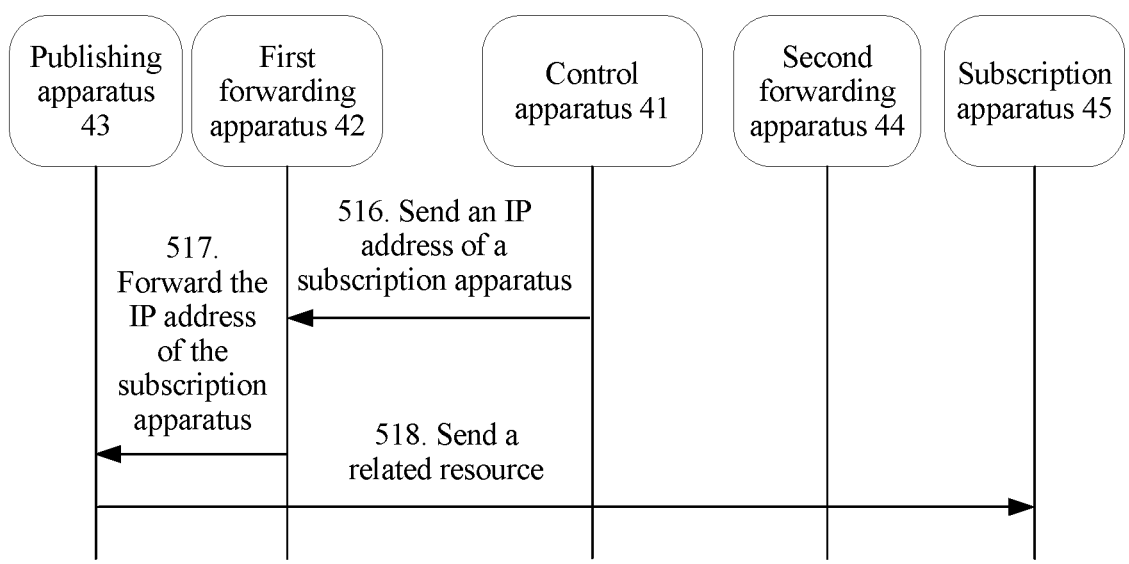
FIG. 7 is a signaling flowchart of a resource subscription system according to a first embodiment of the present disclosure.

Referring to FIG. 5, FIG. 6, and FIG. 7, FIG. 5, FIG. 6, and FIG. 7 are a signaling flowchart of a resource subscription system according to the first embodiment of the present disclosure, and are applicable to the resource subscription system in FIG. 3.

In step 501, the publishing apparatus 43 sends a resource publishing request, where the resource publishing request includes information about a to-be-published resource, node identification information of the publishing apparatus 43, an IP address of the publishing apparatus 43, and node identification information of the control apparatus 41. The node identification information of the publishing apparatus 43 and the node identification information of the control apparatus 41 are used to indicate unofficial network addresss of the publishing apparatus 43 and the control apparatus 41. For example, the node identification information of the publishing apparatus 43 is/publishing apparatus 43, and the node identification information of the control apparatus 41 is/control apparatus 41.

In step 502, the first forwarding apparatus 42 is configured to: receive the resource publishing request, and add node identification information of the first forwarding apparatus 42 to the resource publishing request. For example, the node identification information of the publishing apparatus 43 is/publishing apparatus 43. After the node identification information of the first forwarding apparatus 42 is added to the resource publishing request, the following path is generated:/first forwarding apparatus 42/publishing apparatus 43. In step 503, the first forwarding apparatus 42 sends the resource publishing request to the control apparatus 41 based on the node identification information of the control apparatus 41 in the resource publishing request.

Figure 8:
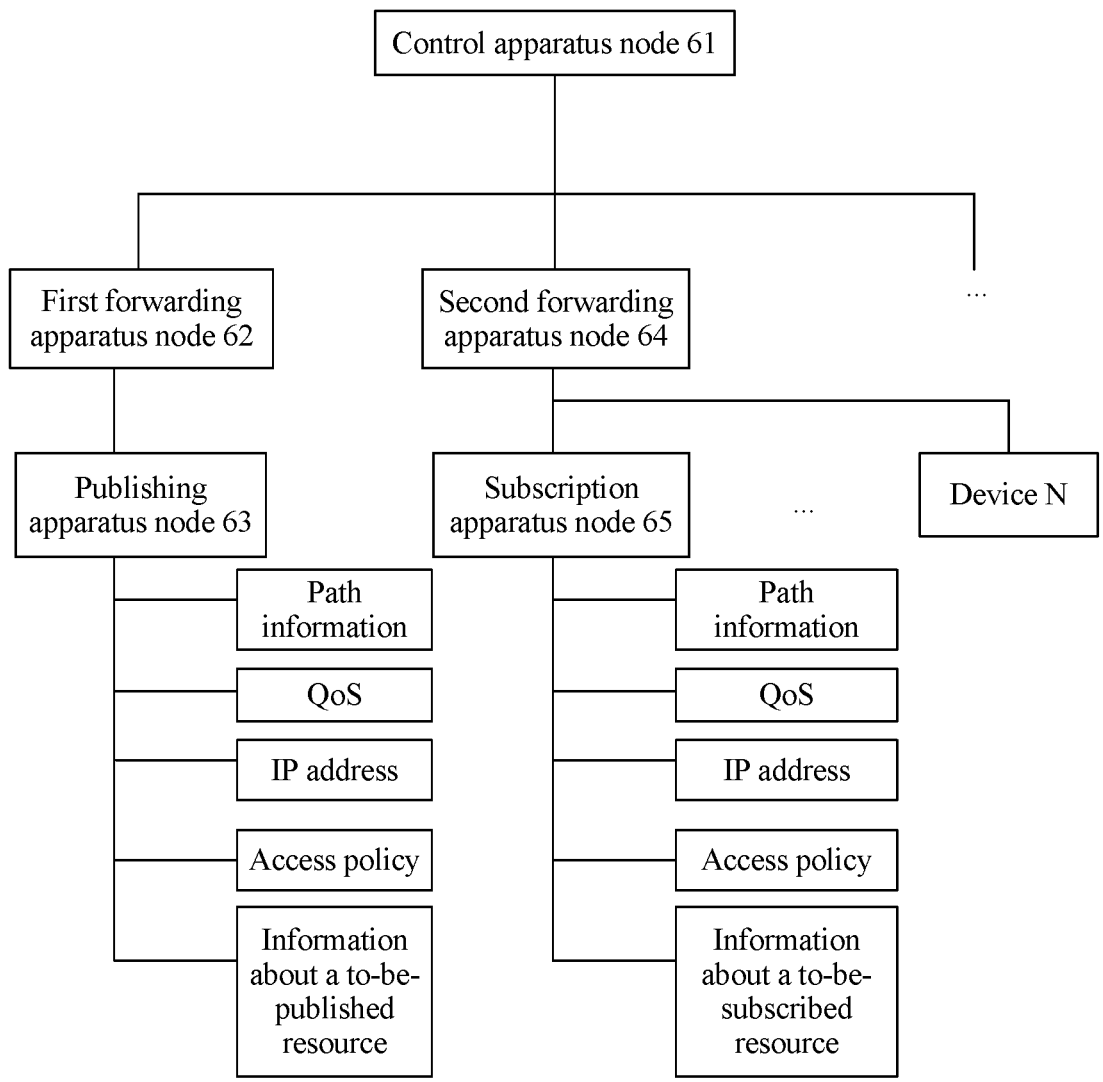
FIG. 8 is a structural diagram of a network resource tree according to a first embodiment of the present disclosure.

In step 504, the transceiver 411 of the control apparatus 41 is configured to receive the resource publishing request, and the processor 413 of the control apparatus 41 is configured to determine path information of the publishing apparatus 43 based on the node identification information of the first forwarding apparatus 42 and the node identification information of the publishing apparatus 43 in the resource publishing request. For example, the path information may be/control apparatus 41/first forwarding apparatus 42/publishing apparatus 43. For ease of description of subsequent steps, refer to FIG. 8. FIG. 8 is a structural diagram of a network resource tree 6. In step 505, the processor 413 stores the path information, the information about a to-be-published resource, and the IP address of the publishing apparatus 43 in a publishing apparatus node 63 of the network resource tree 6. Specifically, after determining the path information of the publishing apparatus 43, the processor 413 may learn of the node, in the network resource tree 6, in which the path information, the information about a to-be-published resource, and the IP address of the publishing apparatus 43 need to be stored. It should be noted that if the publishing apparatus node 63 does not exist, the processor 413 may establish the publishing apparatus node 63 at a proper location in the network resource tree based on the path information; or if the publishing apparatus node 63 already exists, existing information in the publishing apparatus node 63 may be updated. Path information of one apparatus may constitute a network resource tree with only one apparatus node, and path information of a plurality of apparatuses may constitute a network resource tree with a plurality of apparatus nodes.

In addition, steps related to the subscription apparatus 45 are described. In step 506, the subscription apparatus 45 sends a resource subscription request, where the resource subscription request includes information about a to-be-subscribed resource, node identification information of the subscription apparatus 45, an IP address of the subscription apparatus 45, and the node identification information of the control apparatus 41. For example, the node identification information of the subscription apparatus 45 is/subscription apparatus 45, and the node identification information of the control apparatus 41 is/control apparatus 41.

In step 507, the second forwarding apparatus 44 is configured to: receive the resource subscription request, and add node identification information of the second forwarding apparatus 44 to the resource subscription request. For example, the node identification information of the subscription apparatus 45 is/subscription apparatus 45. After the node identification information of the second forwarding apparatus 44 is added to the resource subscription request, the following path is generated:/second forwarding apparatus 44/subscription apparatus 45. In step 508, the second forwarding apparatus 44 sends the resource subscription request to the control apparatus 41 based on the node identification information of the control apparatus 41 in the resource subscription request.

In step 509, the transceiver 411 of the control apparatus 41 is configured to receive the resource subscription request, and the processor 413 of the control apparatus 41 determines path information of the subscription apparatus 45 based on the node identification information of the second forwarding apparatus 44 and the node identification information of the subscription apparatus 45 in the resource subscription request. For example, the path information may be/control apparatus 41/second forwarding apparatus 44/subscription apparatus 45. For ease of description of subsequent steps, refer to FIG. 8. FIG. 8 is a structural diagram of the network resource tree 6. In step 510, the processor 413 stores the path information, the information about a to-be-subscribed resource, and the IP address of the subscription apparatus 45 in a subscription apparatus node 65 of the network resource tree 6. Specifically, after determining the path information of the subscription apparatus 45, the processor 413 may learn of the node, in the network resource tree 6, in which the path information, the information about a to-be-subscribed resource, and the IP address of the subscription apparatus 45 need to be stored. It should be noted that if the subscription apparatus node 65 does not exist, the processor 413 may establish the subscription apparatus node 65 at a proper location in the network resource tree based on the path information; or if the subscription apparatus node 65 already exists, existing information in the subscription apparatus node 65 may be updated.

Figure 9:
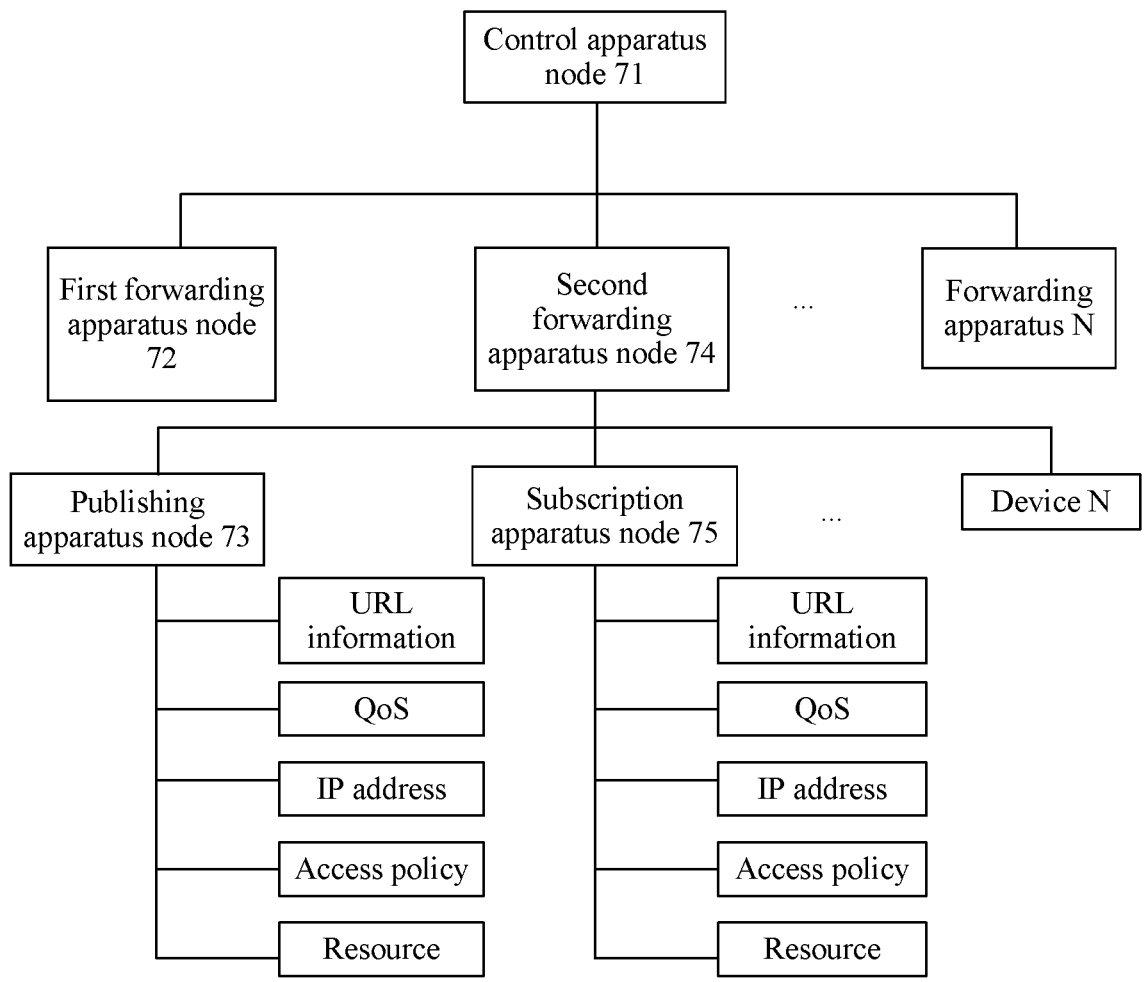
FIG. 9 is a structural diagram of a network resource tree according to a first embodiment of the present disclosure.

It should be noted that in all the foregoing descriptions, the publishing apparatus 43 and the subscription apparatus 45 exchange information with the control apparatus through different forwarding apparatuses. However, the publishing apparatus 43 and the subscription apparatus 45 can also exchange information with the control apparatus through a same forwarding apparatus (for example, the second forwarding apparatus 44). In this way, a network resource tree 7 shown in FIG. 9 may be formed. In FIG. 9, both a subscription apparatus node 75 and a publishing apparatus node 73 are subnodes of a second forwarding apparatus node 74, but in FIG. 8, the subscription apparatus node 65 and the publishing apparatus node 63 are respectively subnodes of the second forwarding apparatus node 64 and the first forwarding apparatus node 62.

It should be further noted that, in this embodiment, a publishing apparatus node and a subscription apparatus node are both placed in a same network resource tree, and a node type (for example, a publishing apparatus node, a subscription apparatus node, or a forwarding apparatus node) of each node in the network resource tree may be learned based on an attribute of the node. In another embodiment, a publishing apparatus node and a subscription apparatus node may be respectively stored in different network resource trees. In other words, the publishing apparatus node is stored in a publishing network resource tree, and the subscription apparatus node is stored in a subscription network resource tree. Attributes of the publishing network resource tree and the subscription network resource tree may be separately set, to distinguish between the publishing network resource tree and the subscription network resource tree.

The following describes how the subscription apparatus 45 subscribes to a resource of the publishing apparatus 43. In step 511, the processor 413 of the control apparatus 41 performs matching in the network resource tree based on the information about a to-be-subscribed resource. If matching information about a to-be-published resource cannot be found, step 514 is performed, and in step 514, the transceiver 411 of the control apparatus 41 sends an alarm message to the second forwarding apparatus 44, so that the alarm message is forwarded to the subscription apparatus 45. If matching information about a to-be-published resource is found, it indicates that the network resource tree has a resource (for example, temperature information of the publishing apparatus 43) to which the subscription apparatus 45 needs to subscribe.

Specifically, at least the following three feasible matching manners are available:

If the information about a to-be-subscribed resource includes a resource ID, the processor 413 of the control apparatus 41 searches for a matching resource ID of information about a to-be-published resource in the network resource tree based on the resource ID of the information about a to-be-subscribed resource, to find a publishing apparatus node in the network resource tree. The processor 413 stores the IP address of the subscription apparatus 45 in the publishing apparatus node, and the transceiver 411 sends the IP address of the subscription apparatus 45 to the publishing apparatus 43, so that the subscription apparatus 45 completes resource subscription to the publishing apparatus 43.

Specifically, the resource ID may indicate resources that an apparatus has. For example, a resource ID is 0001, and 0001 may represent temperature information of the publishing apparatus 43. Therefore, the processor 413 may find, in the network resource tree based on the resource ID, a publishing apparatus node corresponding to the publishing apparatus 43, and store the IP address of the subscription apparatus 45 in the publishing apparatus node. In the example of the network resource tree 6, the IP address of the subscription apparatus 45 is stored in the publishing apparatus node 63. After receiving the IP address of the subscription apparatus 45, the publishing apparatus 43 may transmit the temperature information of the publishing apparatus 43 to the subscription apparatus 45 through P2P communication.

If the information about a to-be-subscribed resource includes a forwarding apparatus ID, the processor 413 of the control apparatus 41 searches for a matching forwarding apparatus ID of information about a to-be-published resource in the network resource tree based on the forwarding apparatus ID of the information about a to-be-subscribed resource, to find a forwarding apparatus node in the network resource tree. The processor 413 stores the IP address of the subscription apparatus 45 in a publishing apparatus node subordinate to or registering with the forwarding apparatus node, and the transceiver 411 sends the IP address of the subscription apparatus 45 to the publishing apparatus 43 corresponding to the publishing apparatus node, so that the subscription apparatus 45 completes resource subscription to the publishing apparatus 43.

Specifically, in the example of the network resource tree 6, the forwarding apparatus ID may indicate a forwarding apparatus, for example, the first forwarding apparatus 42. Therefore, the processor 413 may find, in the network resource tree 6 based on the forwarding apparatus ID, the first forwarding apparatus node 62 corresponding to the first forwarding apparatus 42, and store the IP address of the subscription apparatus 45 in the publishing apparatus node 63 subordinate to or registering with the first forwarding apparatus node 62. After receiving the IP address of the subscription apparatus 45, the publishing apparatus 43 may transmit all resource information (for example, temperature information) of the publishing apparatus 43 to the subscription apparatus 45 through P2P communication.

It should be noted that, if the first forwarding apparatus node 62 has a plurality of subordinate publishing apparatus nodes, the IP address of the subscription apparatus 45 is stored in all the publishing apparatus nodes subordinate to or registering with the first forwarding apparatus node 62, and the IP address of the subscription apparatus 45 is also transmitted to all publishing apparatuses corresponding to the publishing apparatus nodes. After receiving the IP address of the subscription apparatus 45, each publishing apparatus may transmit all resource information (for example, temperature information) of the publishing apparatus to the subscription apparatus 45 through P2P communication. In other words, the subscription apparatus 45 receives all the resource information from each publishing apparatus.

If the information about a to-be-subscribed resource includes a resource type, the processor 413 finds, based on the resource type, all publishing apparatus nodes including the resource type, and stores the IP address of the subscription apparatus 45 in all the publishing apparatus nodes. The transceiver 411 sends the IP address of the subscription apparatus 45 to all publishing apparatuses (including the publishing apparatus 43), so that the subscription apparatus 45 completes resource subscription to all the publishing apparatuses.

Specifically, in the example of the network resource tree 6 and of the resource type of temperature, the processor 413 of the control apparatus 41 finds, in the network resource tree 6 based on the resource type, all publishing apparatus nodes including the temperature resource type, and stores the IP address of the subscription apparatus 45 in all the publishing apparatus nodes including the temperature resource type. The transceiver 411 sends the IP address of the subscription apparatus 45 to all publishing apparatuses (including the publishing apparatus 43) including the temperature resource type. After receiving the IP address of the subscription apparatus 45, all the publishing apparatuses including the temperature resource type may transmit respective temperature information to the subscription apparatus 45 through P2P communication. In other words, the subscription apparatus 45 may receive a plurality of pieces of temperature information from different publishing apparatuses.

After step 511 is completed, if a publishing apparatus node is found, the resource subscription request includes a subscription QoS parameter, and the resource publishing request includes a publishing QoS parameter and an access policy, in step 512, the processor 413 of the control apparatus 41 determines whether the subscription QoS parameter matches the publishing QoS parameter. If the subscription QoS parameter does not match the publishing QoS parameter, step 514 is performed, and in step 514, the transceiver 411 of the control apparatus 41 sends an alarm message to the second forwarding apparatus 44, so that the alarm message is forwarded to the subscription apparatus 45. If the subscription QoS parameter matches the publishing QoS parameter, in step 513, after finding a publishing apparatus node, the processor determines whether the subscription apparatus 45 matches the access policy. If the subscription apparatus 45 does not match the access policy, step 514 is performed, and in step 514, the transceiver 411 of the control apparatus 41 sends an alarm message to the second forwarding apparatus 44, so that the alarm message is forwarded to the subscription apparatus 45. If the subscription apparatus 45 matches the access policy, step 515 is performed.

For example, in an example of a delay, if the subscription QoS parameter is 40 ms and the publishing QoS parameter is 20 ms, the subscription QoS parameter matches the publishing QoS parameter; if the subscription QoS parameter is 20 ms and the publishing QoS parameter is 40 ms, the subscription QoS parameter does not match the publishing QoS parameter. Moreover, if the access policy is that any subscription apparatus is allowed to subscribe to a resource, the subscription apparatus 45 matches the access policy; or if the access policy is that the subscription apparatus 45 is not allowed to subscribe to a resource, the subscription apparatus 45 does not match the access policy. It should be noted that step 512 and step 513 are optional, and a sequence of step 511, step 512, and step 513 may be changed and is not limited thereto.

In another feasible implementation of this embodiment, for example, another publishing apparatus (not shown in the figures) sends a resource publishing request to the control apparatus 41. The processor 413 of the control apparatus 41 may update or establish a corresponding publishing apparatus node in the network resource tree in the foregoing manner. The processor 413 may further search in the network resource tree for information about a to-be-subscribed resource that matches information about a to-be-published resource of the another publishing apparatus, to find a subscription apparatus node in the network resource tree. If the matching information about a to-be-subscribed resource is found, the processor 413 stores the IP address of the subscription apparatus in the publishing apparatus node of the another publishing apparatus, and the transceiver 411 of the control apparatus 41 sends the IP address of the subscription apparatus to the another publishing apparatus, to automatically involve the another publishing apparatus in resource subscription of the subscription apparatus, or in other words to enable the another publishing apparatus publish resource to the subscription apparatus.

For example, if the information about a to-be-subscribed resource includes a forwarding apparatus ID, and the network resource tree includes a forwarding apparatus node, when the publishing apparatus node of the another publishing apparatus belongs to a subnode of the forwarding apparatus node, it indicates that the control apparatus 41 needs to automatically involve the another publishing apparatus in resource subscription of the subscription apparatus. Similarly, if the information about a to-be-subscribed resource includes a resource type and the another publishing apparatus also has the same resource type, it indicates that the control apparatus 41 needs to automatically involve the another publishing apparatus in resource subscription of the subscription apparatus.

In step 515, the processor 413 of the control apparatus 41 stores the IP address of the subscription apparatus 45 in the publishing apparatus node. In step 516, the transceiver 411 of the control apparatus 41 sends the IP address of the subscription apparatus 45 to the first forwarding apparatus 42. In step 517, the first forwarding apparatus 42 forwards the IP address of the subscription apparatus 45 to the publishing apparatus 43. It should be noted that, in step 516 and step 517, the IP address of the subscription apparatus 45 is transmitted to the publishing apparatus 43 in a hop-by-hop manner. The control apparatus 41 may also directly send the IP address of the subscription apparatus 45 to the publishing apparatus 43 based on the IP address of the publishing apparatus 43.

In step 518, after obtaining the IP address of the subscription apparatus 45, the publishing apparatus 43 may perform P2P communication with the subscription apparatus 45 based on the IP address of the subscription apparatus 45, to transmit, to the subscription apparatus 45, the resource (for example, the temperature information of the publishing apparatus 43) to which the subscription apparatus 45 subscribes.

It should be noted that, for consideration of security, the publishing apparatus 43 and the subscription apparatus 45 may add respective certificates to the resource publishing request and the resource subscription request, so that the control apparatus 41 obtains the respective certificates of the publishing apparatus 43 and the subscription apparatus 45. Then, the control apparatus 41 may send the certificate of the subscription apparatus 45 to the publishing apparatus 43, and the publishing apparatus 43 authenticates the certificate; the control apparatus 41 may also send the certificate of the publishing apparatus 43 to the subscription apparatus 45, and the subscription apparatus 45 authenticates the certificate. After the subscription apparatus 45 and the publishing apparatus 43 perform authentication, the publishing apparatus 43 may perform P2P communication with the subscription apparatus 45 based on the IP address of the subscription apparatus 45.

As shown in FIG. 4, the memory 415 of the control apparatus 41 stores one or more software modules (for example, a determining module and a matching module). These software modules may be implemented by using the processor 413 or program code in the memory 415, to implement subscription to a resource of the publishing apparatus.

In conclusion, according to the subscription system in the first embodiment of the present disclosure, the subscription apparatus 45 and the publishing apparatus 43 may respectively send the resource subscription request and the resource publishing request to the control apparatus 41 through the forwarding apparatuses, to establish the network resource tree. Then, the control apparatus 41 can use a relatively exact or fuzzy matching manner to make the subscription apparatus subscribe to a resource of the publishing apparatus, and make the subscription apparatus 45 and the publishing apparatus 43 perform P2P communication, thereby taking both transmission efficiency and subscription efficiency into account.

Figure 10:
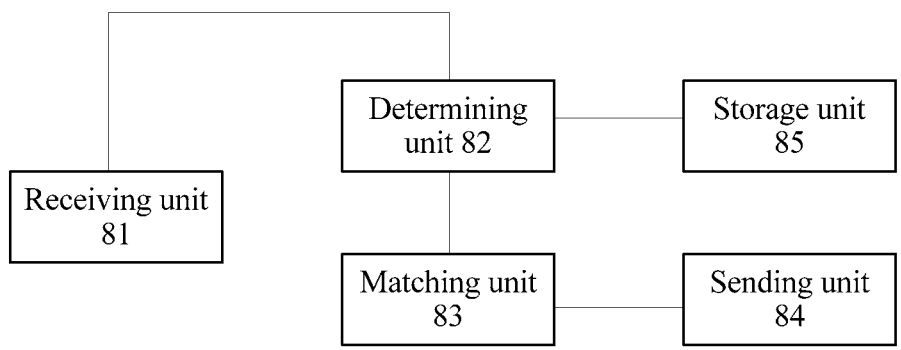
FIG. 10 is a structural diagram of a control apparatus according to a first embodiment of the present disclosure.

As shown in FIG. 10, an embodiment of the present disclosure further provides a structural diagram of a control apparatus. The control apparatus 8 includes a receiving unit 81, a determining unit 82, a matching unit 83, a sending unit 84, and a storage unit 85.

The receiving unit 81 is configured to receive a resource publishing request from a publishing apparatus, where the resource publishing request includes information about a to-be-published resource, node identification information of the publishing apparatus, node identification information of a first forwarding apparatus, and an IP address of the publishing apparatus. The determining unit 82 is configured to determine path information of the publishing apparatus based on the node identification information of the first forwarding apparatus and the node identification information of the publishing apparatus in the resource publishing request. The storage unit 85 is configured to store the path information, the information about a to-be-published resource, and the IP address of the publishing apparatus in a publishing apparatus node of a network resource tree. The receiving unit 81 is further configured to receive a resource subscription request, where the resource subscription request includes information about a to-be-subscribed resource, node identification information of a subscription apparatus, an IP address of the subscription apparatus, and node identification information of a second forwarding apparatus. The determining unit 82 is further configured to determine path information of the subscription apparatus based on the node identification information of the second forwarding apparatus and the node identification information of the subscription apparatus in the resource subscription request. The storage unit 85 is further configured to store the path information, the information about a to-be-subscribed resource, and the IP address of the subscription apparatus in a subscription apparatus node of the network resource tree. The matching unit 83 is configured to perform matching in the network resource tree based on the information about a to-be-subscribed resource. The sending unit 84 is configured to, after corresponding information about a to-be-published resource is found, send the IP address of the subscription apparatus to a publishing apparatus corresponding to the information about a to-be-published resource. In this way, the subscription apparatus subscribes to a resource of the publishing apparatus, and the subscription apparatus and the publishing apparatus perform P2P communication.

In this embodiment, the control apparatus 8 is presented in a form of functional unit. The "unit" herein may be an application-specific integrated circuit (ASIC), a circuit, a processor and a memory that execute one or more software or firmware programs, an integrated logical circuit, and/or another component that can provide the foregoing functions. In a simple embodiment, a person skilled in the art can figure out that the control apparatus 8 may use the form shown in FIG. 4. The receiving unit 81, the determining unit 82, the matching unit 83, the sending unit 84, and the storage unit 85 may be implemented by using the processor, the transceiver, and the memory in FIG. 4.

An embodiment of the present disclosure further provides a computer storage medium, configured to store a computer software instruction used by the control apparatus shown in FIG. 10, and the computer storage medium includes a program designed for executing the foregoing embodiment. Resource subscription may be implemented by executing the stored program.

In the first embodiment of the present disclosure provided in FIG. 5, FIG. 6, and FIG. 7, the publishing apparatus performs P2P communication with the subscription apparatus based on the IP address of the subscription apparatus sent by the control apparatus, and sends, to the subscription apparatus, the resource to which the subscription apparatus subscribes. In a live network, there are also some devices or apparatuses having a network autodiscovery function, for example, a publishing apparatus and a subscription apparatus that support the DDS protocol. The devices or apparatuses may automatically discover another device in the network in a multicast manner or another technology, and perform P2P communication. When the publishing apparatus and the subscription apparatus have the network autodiscovery function, the publishing apparatus can automatically discover the subscription apparatus and communicate with the subscription apparatus without the control apparatus. In this way, in the resource subscription system shown in FIG. 3 or FIG. 4, communication between apparatuses or between the publishing apparatus and the subscription apparatus lacks overall control and supervision, and the cloud platform (a cloud platform deployed together with the control apparatus) or the control apparatus cannot sense devices performing P2P communication and content of the communication in the system. This is unfavorable for the cloud platform or the control apparatus in performing management and resource control on the system, and also results in some security risks.

Therefore, the embodiments of the present disclosure provide a second embodiment of the present disclosure for a publishing apparatus and a subscription apparatus that have a network autodiscovery function. In the second embodiment, a publishing apparatus reports information about a to-be-published resource and node identification information to a control apparatus, and the subscription apparatus reports the information about a to-be-subscribed resource, the node identification information, and addressing information to the control apparatus. The addressing information is addressing information of the subscription apparatus carried when the subscription apparatus performs network autodiscovery. The addressing information may be node identification information, may be IP address information, or may be identification information (for example, a GUID (globally unique identifier) in the DDS protocol) used in another network autodiscovery technology. The control apparatus performs matching between a to-be-published resource and a to-be-subscribed resource based on a matching rule, and sends, to the publishing apparatus, addressing information of a reachable subscription apparatus. After discovering a subscription apparatus by using a network autodiscovery function, the publishing apparatus checks, based on the addressing information of the subscription apparatus, whether the subscription apparatus is included in a range of reachable subscription apparatuses. If the subscription apparatus is included in the range of reachable subscription apparatuses, the publishing apparatus establishes a P2P connection to the subscription apparatus; or if the subscription apparatus is not included in the range of reachable subscription apparatuses, the publishing apparatus does not establish a P2P connection to the apparatus. In addition, the second embodiment is different from the first embodiment in that in the second embodiment, an address of the control apparatus needs to be configured only for a device or an apparatus directly connected to the control apparatus, the address of the control apparatus does not need to be configured for the publishing apparatus and the subscription apparatus, and apparatuses in a resource subscription system perform communication based on a registration relationship. For example, in FIG. 2, the apparatus 33 registers with the gateway 37, and sends a resource publishing message to the gateway 37, the gateway 37 registers with the gateway 32, and forwards the received resource publishing message to the gateway 32, the gateway 32 registers with the cloud platform 36, and forwards the received resource publishing message to the cloud platform 36, and the cloud platform 36 registers with the control apparatus 31, and forwards the received resource publishing message to the control apparatus 31. Similarly, when the control apparatus 31 sends a message to the apparatus 33, the message is also delivered to the apparatus 33 layer by layer based on a registration relationship.

Figure 11A:
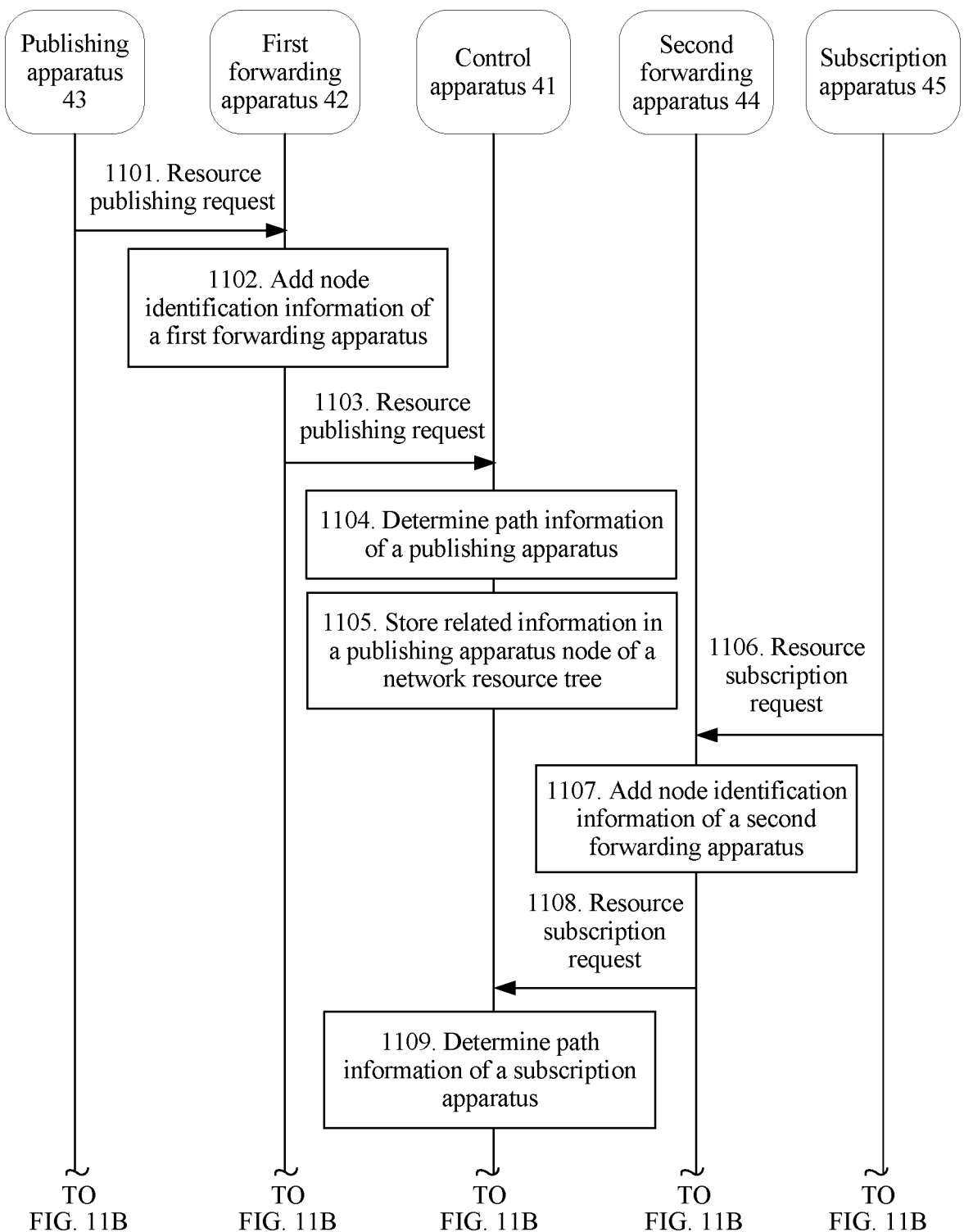
FIG. 11A and FIG. 11B are a signaling flowchart of a resource subscription system according to a second embodiment of the present disclosure.
Figure 11B:
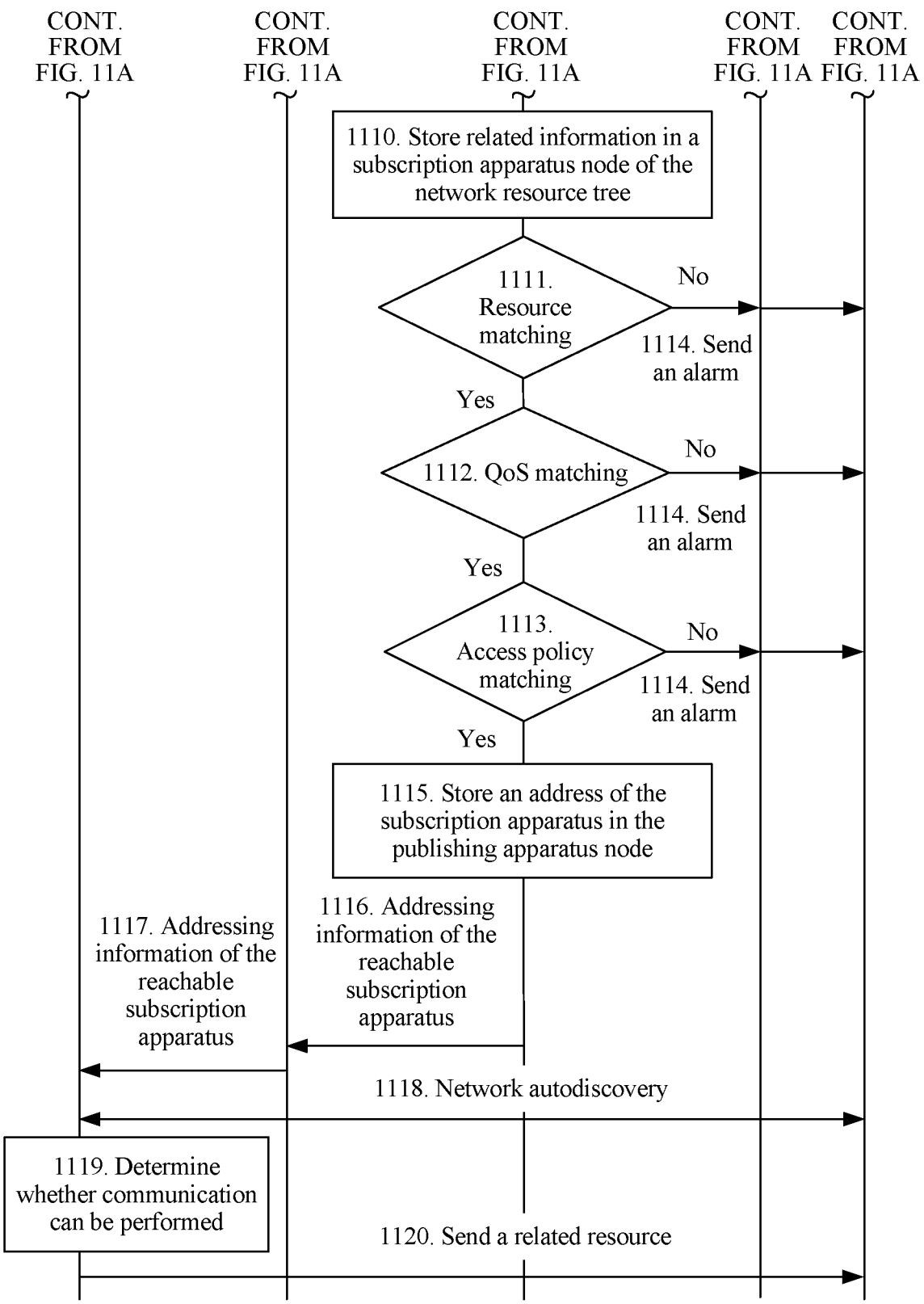

The following describes a resource subscription method according to the second embodiment of the present disclosure by using FIG. 11A and FIG. 11B. The method is applicable to the resource subscription system in FIG. 3.

In step 1101, the publishing apparatus 43 sends a resource publishing request to a node, to be specific, the first forwarding apparatus 42, with which the publishing apparatus 43 registers, where the resource publishing request includes information about a to-be-published resource (for example, a resource name and attribute) and node identification information of the publishing apparatus 43. The node identification information of the publishing apparatus 43 is used to indicate an unofficial network address of the publishing apparatus 43. For example, the node identification information of the publishing apparatus 43 is/publishing apparatus 43.

In step 1102, the first forwarding apparatus 42 is configured to: receive the resource publishing request, and add node identification information of the first forwarding apparatus 42 to the resource publishing request. For example, the node identification information of the publishing apparatus 43 is/publishing apparatus 43. After the node identification information of the first forwarding apparatus 42 is added to the resource publishing request, the following path is generated:/first forwarding apparatus 42/publishing apparatus 43.

In step 1103, the first forwarding apparatus 42 sends the resource publishing request to the control apparatus 41 with which the first forwarding apparatus 42 registers.

In step 1104, the control apparatus 41 determines path information of the publishing apparatus 43 (in other words, a path of the publishing apparatus in a network resource tree). For details, refer to step 504.

Figure 12:
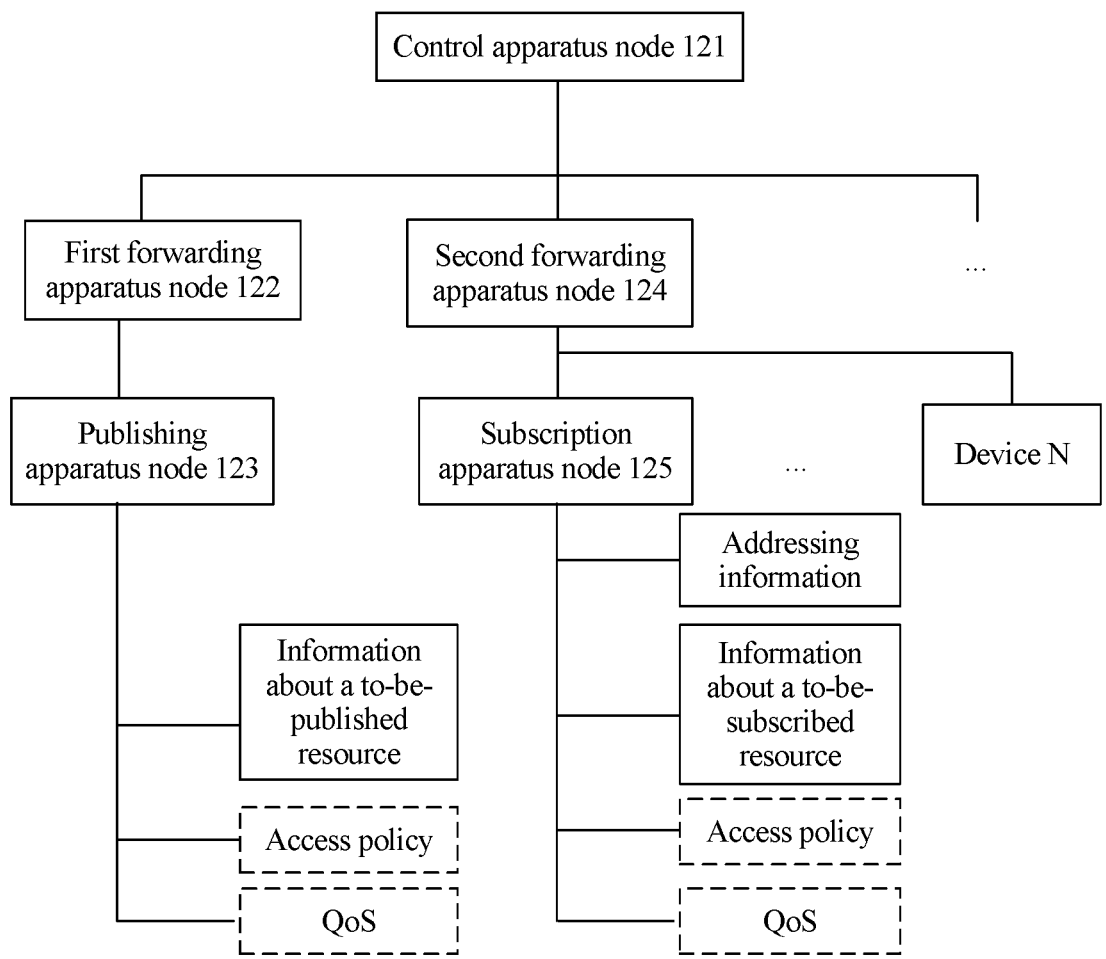
FIG. 12 is a structural diagram of a network resource tree according to a second embodiment of the present disclosure.

In step 1105, a processor 413 stores the information about a to-be-published resource in a publishing apparatus node 123 of a network resource tree 12 shown in FIG. 12. Specifically, after determining the path information of the publishing apparatus 43, the processor 413 may learn of the node, in the network resource tree 12, in which the information about a to-be-published resource needs to be stored. It should be noted that if the publishing apparatus node 123 does not exist, the processor 413 may establish the publishing apparatus node 123 at a proper location in the network resource tree based on the path information; or if the publishing apparatus node 123 already exists, existing information in the publishing apparatus node 123 may be updated. Path information of one apparatus may constitute a network resource tree with only one apparatus node, and path information of a plurality of apparatuses may constitute a network resource tree with a plurality of apparatus nodes.

In addition, steps related to the subscription apparatus 45 are described.

In step 1106, the subscription apparatus 45 sends a resource subscription request, where the resource subscription request includes information about a to-be-subscribed resource, node identification information of the subscription apparatus 45, and addressing information of the subscription apparatus 45. The node identification information of the subscription apparatus 45 is used to indicate an unofficial network address of the subscription apparatus 45. For example, the node identification information of the subscription apparatus 45 is/subscription apparatus 45. The addressing information of the subscription apparatus 45 is addressing information of the subscription apparatus 45 carried when the subscription apparatus 45 performs network autodiscovery. For example, the addressing information of the subscription apparatus 45 may be the same as the node identification information and is /subscription apparatus 45; or may be an IP address. When the subscription apparatus 45 performs network autodiscovery by using the DDS protocol, alternatively, the addressing information of the subscription apparatus 45 may be a GUID.

In step 1107, the second forwarding apparatus 44 is configured to: receive the resource subscription request, and add node identification information of the second forwarding apparatus 44 to the resource subscription request. For details, refer to the descriptions of step 507.

In step 1108, the second forwarding apparatus 44 forwards the resource subscription request to the control apparatus 41 with which the second forwarding apparatus 44 registers.

In step 1109, the control apparatus 41 determines path information of the subscription apparatus 45 (in other words, a path of the subscription apparatus in the network resource tree). For details, refer to step 509.

In step 1110, the processor 413 of the control apparatus 41 stores the information about a to-be-subscribed resource and the addressing information of the subscription apparatus 45 in a subscription apparatus node 125 of the network resource tree 12. Specifically, after determining the path information of the subscription apparatus 45, the processor 413 may learn of the node, in the network resource tree 12, in which the information about a to-be-subscribed resource and the addressing information of the subscription apparatus 45 need to be stored. It should be noted that if the subscription apparatus node 125 does not exist, the processor 413 may establish the subscription apparatus node 125 at a proper location in the network resource tree based on the path information; or if the subscription apparatus node 125 already exists, existing information in the subscription apparatus node 125 may be updated.

Figure 13:
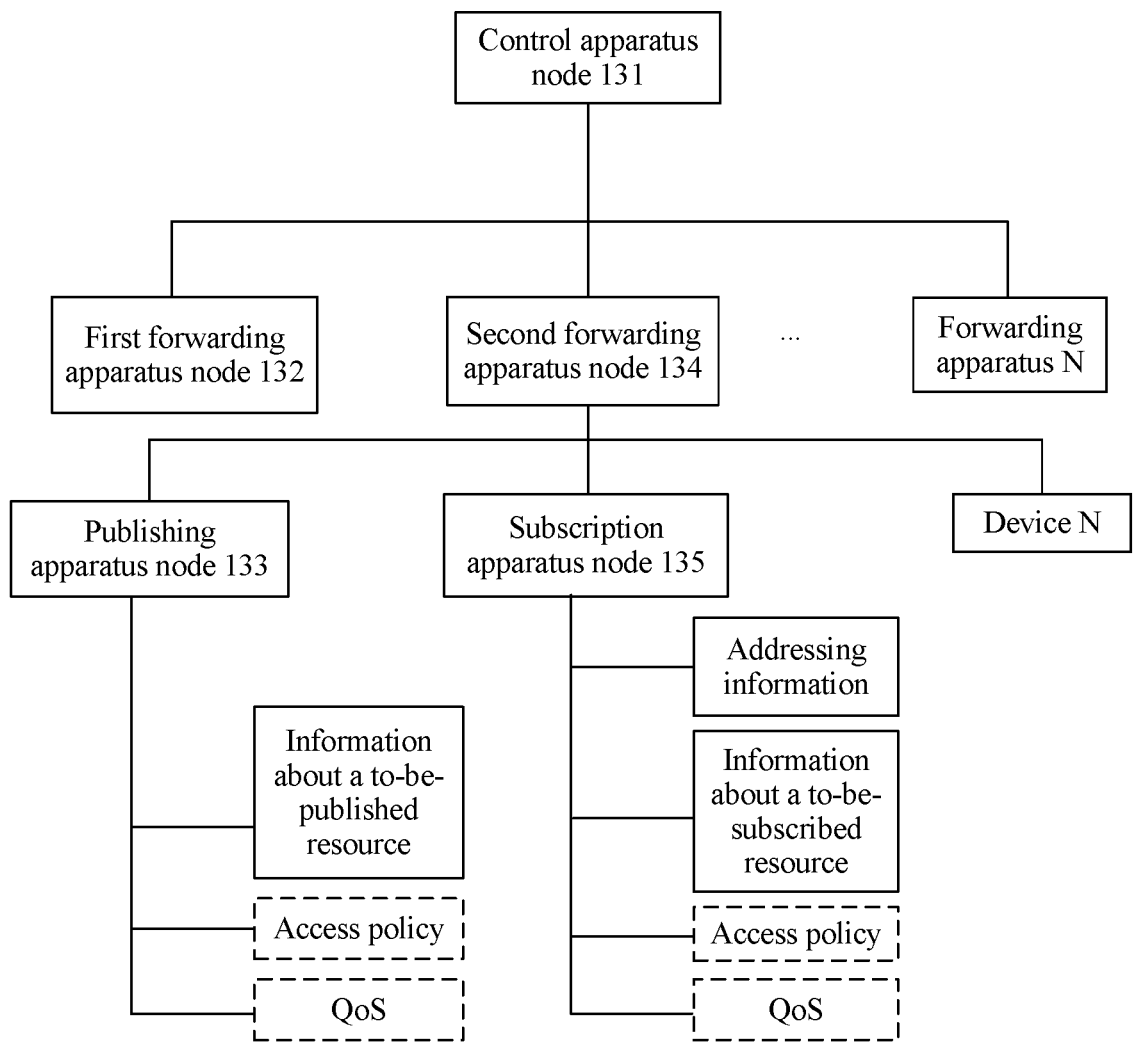
FIG. 13 is a structural diagram of another network resource tree according to a second embodiment of the present disclosure.

It should be noted that in all the foregoing descriptions, the publishing apparatus 43 and the subscription apparatus 45 exchange information with the control apparatus through different forwarding apparatuses. However, the publishing apparatus 43 and the subscription apparatus 45 can also exchange information with the control apparatus through a same forwarding apparatus (for example, the second forwarding apparatus 44). In this way, a network resource tree 13 shown in FIG. 13 may be formed. In FIG. 13, both a subscription apparatus node 135 and a publishing apparatus node 133 are subnodes of a second forwarding apparatus node 134.

It should be further noted that, in this embodiment, a publishing apparatus node and a subscription apparatus node are both placed in a same network resource tree, and a node type (for example, a publishing apparatus node, a subscription apparatus node, or a forwarding apparatus node) of each node in the network resource tree may be learned based on an attribute of the node. In another embodiment, a publishing apparatus node and a subscription apparatus node may be respectively stored in different network resource trees. In other words, the publishing apparatus node is stored in a publishing network resource tree, and the subscription apparatus node is stored in a subscription network resource tree. Attributes of the publishing network resource tree and the subscription network resource tree may be separately set, to distinguish between the publishing network resource tree and the subscription network resource tree.

The following describes how the subscription apparatus 45 subscribes to a resource of the publishing apparatus 43.

In step 1111, the processor 413 of the control apparatus 41 performs matching in the network resource tree based on the information about a to-be-subscribed resource. If matching information about a to-be-published resource cannot be found, optionally, step 1114 may be performed, and in step 1114, a transceiver 411 of the control apparatus 41 sends an alarm message to the second forwarding apparatus 44, so that the alarm message is forwarded to the subscription apparatus 45. If matching information about a to-be-published resource is found, it indicates that the network resource tree has a resource (for example, temperature information of the publishing apparatus 43) to which the subscription apparatus 45 needs to subscribe.

Specifically, the control apparatus 41 performs matching between resource information reported by the subscription apparatus and the publishing apparatus. A form and content of the resource information may be of a plurality of types. This embodiment of the present disclosure sets no limitation thereto. This embodiment of the present disclosure uses only the following three possible matching manners as an example for description.

If the information about a to-be-subscribed resource includes a resource ID, the processor 413 of the control apparatus 41 searches for a matching resource ID of information about a to-be-published resource in the network resource tree based on the resource ID of the information about a to-be-subscribed resource. When a matching publishing apparatus node is found in the network resource tree, the processor 413 stores the addressing information of the subscription apparatus 45 in the publishing apparatus node, and the transceiver 411 sends the addressing information of the subscription apparatus 45 to the publishing apparatus 43. Refer to steps 1116 and 1117.

Specifically, the resource ID may indicate resources that an apparatus has. For example, a resource ID is 0001, and 0001 may represent temperature information of the publishing apparatus 43. Therefore, the processor 413 may find, in the network resource tree based on the resource ID, a publishing apparatus node corresponding to the publishing apparatus 43, and store the addressing information of the subscription apparatus 45 in the publishing apparatus node. In the example of the network resource tree 12, the addressing information of the subscription apparatus 45 is stored in the publishing apparatus node 123.

If the information about a to-be-subscribed resource includes a forwarding apparatus ID, the processor 413 of the control apparatus 41 searches for a matching forwarding apparatus ID of information about a to-be-published resource in the network resource tree based on the forwarding apparatus ID of the information about a to-be-subscribed resource, to find a forwarding apparatus node in the network resource tree. The processor 413 stores the addressing information of the subscription apparatus 45 in a publishing apparatus node subordinate to or registering with the forwarding apparatus node, and the transceiver 411 sends the addressing information of the subscription apparatus 45 to the publishing apparatus 43 corresponding to the publishing apparatus node.

Specifically, in the example of the network resource tree 12, the forwarding apparatus ID may indicate a forwarding apparatus, for example, the first forwarding apparatus 42. Therefore, the processor 413 may find, in the network resource tree 12 based on the forwarding apparatus ID, a first forwarding apparatus node 122 corresponding to the first forwarding apparatus 42, and store the addressing information of the subscription apparatus 45 in the publishing apparatus node 123 subordinate to or registering with the first forwarding apparatus node 122.

It should be noted that, if the first forwarding apparatus node 122 has a plurality of subordinate publishing apparatus nodes, the addressing information of the subscription apparatus 45 is stored in all the publishing apparatus nodes subordinate to or registering with the first forwarding apparatus node 122, and the addressing information of the subscription apparatus 45 is also transmitted to all publishing apparatuses corresponding to all the publishing apparatus nodes.

If the information about a to-be-subscribed resource includes a resource type, the processor 413 finds, based on the resource type, all publishing apparatus nodes including the resource type, and stores the addressing information of the subscription apparatus 45 in all the publishing apparatus nodes. The transceiver 411 sends the addressing information of the subscription apparatus 45 to all publishing apparatuses (including the publishing apparatus 43).

Specifically, in the example of the network resource tree 12 and of the resource type of temperature, the processor 413 of the control apparatus 41 finds, based on the resource type, all publishing apparatus nodes including the temperature resource type in the network resource tree 12, and stores the addressing information of the subscription apparatus 45 in all the publishing apparatus nodes including the temperature resource type. The transceiver 411 sends the addressing information of the subscription apparatus 45 to all publishing apparatuses (including the publishing apparatus 43) including the temperature resource type.

It should be noted that in the procedure descriptions of the foregoing three matching manners, it is assumed that the control apparatus 41 does not perform further matching described in steps 1112 and 1113. If the resource subscription request includes a subscription QoS parameter, and the resource publishing request includes a publishing QoS parameter and an access policy, after the control apparatus 41 finds the matching publishing apparatus node in step 1111, optionally, the control apparatus 41 may further perform steps 1112 and 1113, to perform QoS parameter matching and access policy matching. In this case, only after matching is successful in all of steps 1111, 1112, and 1113, the processor 413 can store the addressing information of the subscription apparatus 45 in the publishing apparatus node (refer to step 1115), and the transceiver 411 sends the addressing information of the subscription apparatus 45 to the publishing apparatus 43 (refer to step 1116).

After step 1111 is completed, if a publishing apparatus node is found, the resource subscription request includes a subscription QoS parameter, and the resource publishing request includes a publishing QoS parameter and an access policy, optionally, in step 1112, the processor 413 of the control apparatus 41 determines whether the subscription QoS parameter matches the publishing QoS parameter. If the subscription QoS parameter does not match the publishing QoS parameter, optionally, step 1114 may be performed, and in step 1114, the transceiver 411 of the control apparatus 41 sends an alarm message to the second forwarding apparatus 44, so that the alarm message is forwarded to the subscription apparatus 45. If the subscription QoS parameter matches the publishing QoS parameter, optionally, in step 1113, after finding a publishing apparatus node, the processor determines whether the subscription apparatus 45 matches the access policy. If the subscription apparatus 45 does not match the access policy, optionally, step 1114 is performed, and in step 1114, the transceiver 411 of the control apparatus 41 sends an alarm message to the second forwarding apparatus 44, so that the alarm message is forwarded to the subscription apparatus 45. If the subscription apparatus 45 matches the access policy, step 1115 is performed.

For example, in an example of a delay, if the subscription QoS parameter is 40 ms and the publishing QoS parameter is 20 ms, the subscription QoS parameter matches the publishing QoS parameter; if the subscription QoS parameter is 20 ms and the publishing QoS parameter is 40 ms, the subscription QoS parameter does not match the publishing QoS parameter. Moreover, if the access policy is that any subscription apparatus is allowed to subscribe to a resource, the subscription apparatus 45 matches the access policy; or if the access policy is that the subscription apparatus 45 is not allowed to subscribe to a resource, the subscription apparatus 45 does not match the access policy. It should be noted that step 1112 and step 1113 are optional, and a sequence of step 1111, step 1112, and step 1113 may be changed and is not limited thereto.

It should be further noted that in addition to performing matching in steps 1111, 1112, and 1113, the control apparatus 41 may control, from another dimension based on a locally configured P2P communication management rule, the publishing apparatus and the subscription apparatus that can perform P2P communication. For example, the control apparatus 41 divides devices in a network into groups or domains. Only a publishing apparatus and a subscription apparatus that belong to a same group or a same domain can perform P2P communication. In the example of the network resource tree 12, the control apparatus considers apparatuses subordinate to or registering with the first forwarding apparatus as a group 1, and considers apparatuses subordinate to or registering with the second forwarding apparatus as a group 2. Apparatuses in a same group can perform P2P communication, and apparatuses in different groups are prohibited from performing P2P communication in consideration of security. For example, in a process in which the control apparatus 41 performs resource information matching, even if the subscription apparatus 45 and the publishing apparatus 43 match in terms of resource information, the subscription apparatus 45 and the publishing apparatus 43 still cannot perform P2P communication because the subscription apparatus 45 and the publishing apparatus 43 do not belong to a same group, and the control apparatus 41 does not send the addressing information of the subscription apparatus 45 to the publishing apparatus 43. The locally configured P2P communication management rule of the control apparatus is not limited in this embodiment of the present disclosure.

In another feasible implementation of this embodiment, for example, another publishing apparatus (not shown in the figures) sends a resource publishing request to the control apparatus 41. The processor 413 of the control apparatus 41 may update or establish a corresponding publishing apparatus node in the network resource tree in the foregoing manner. The processor 413 may further search in the network resource tree for information about a to-be-subscribed resource that matches information about a to-be-published resource of the another publishing apparatus, to find a subscription apparatus node in the network resource tree. If the matching information about a to-be-subscribed resource is found, the processor 413 stores the addressing information of the subscription apparatus in the publishing apparatus node of the another publishing apparatus, and the transceiver 411 of the control apparatus 41 sends the addressing information of the subscription apparatus to the another publishing apparatus, to automatically involve the another publishing apparatus in resource subscription of the subscription apparatus.

For example, if the information about a to-be-subscribed resource includes a forwarding apparatus ID, and the network resource tree includes a forwarding apparatus node, when the publishing apparatus node of the another publishing apparatus belongs to a subnode of the forwarding apparatus node, it indicates that the control apparatus 41 needs to automatically involve the another publishing apparatus in resource subscription of the subscription apparatus. Similarly, if the information about a to-be-subscribed resource includes a resource type and the another publishing apparatus also has the same resource type, it indicates that the control apparatus 41 needs to automatically involve the another publishing apparatus in resource subscription of the subscription apparatus.

In step 1115, the processor 413 of the control apparatus 41 stores the addressing information of the subscription apparatus 45 in the publishing apparatus node. In step 1116, the transceiver 411 of the control apparatus 41 sends the addressing information of the subscription apparatus 45 to the first forwarding apparatus 42. In step 1117, the first forwarding apparatus 42 forwards the addressing information of the subscription apparatus 45 to the publishing apparatus 43. It should be noted that, in step 1116 and step 1117, the addressing information of the subscription apparatus 45 is transmitted to the publishing apparatus 43 in a hop-by-hop manner. After receiving the addressing information of the subscription apparatus 45, the publishing apparatus 43 records the addressing information of the subscription apparatus 45, for example, records the addressing information in a list of reachable apparatuses.

In step 1118, the publishing apparatus 43 and the subscription apparatus 45 discover each other in a network autodiscovery process. The publishing apparatus 43 receives the addressing information of the subscription apparatus 45 in the network autodiscovery process.

In step 1119, the publishing apparatus 43 checks whether the addressing information of the subscription apparatus 45 received in the network autodiscovery process is in the list of reachable apparatuses. If the addressing information of the subscription apparatus 45 is in the list of reachable apparatuses, in step 1120, the publishing apparatus 43 establishes a P2P connection to the subscription apparatus 45, and publishes a to-be-subscribed resource to the subscription apparatus 45; or if the addressing information of the subscription apparatus 45 is not in the list of reachable apparatuses, the publishing apparatus 43 does not establish a connection to the subscription apparatus 45.

In the second embodiment of the present disclosure, an address of the control apparatus 41 does not need to be configured for the publishing apparatus 43 and the subscription apparatus 45, and the publishing apparatus 43 and the subscription apparatus 45 only need to report a to-be-published resource and a to-be-subscribed resource based on a registration relationship hierarchy. After performing matching between a to-be-published resource and a to-be-subscribed resource, the control apparatus 41 delivers a reachability list to the publishing apparatus 43. Before the publishing apparatus 43 and the subscription apparatus 45 establish a P2P connection based on respective network autodiscovery capabilities, the publishing apparatus 43 further needs to check whether the subscription apparatus 45 is within a reachability list range published by the control apparatus 41. In other words, in the resource subscription method described in the second embodiment, the respective network autodiscovery capabilities of the publishing apparatus and the subscription apparatus are leveraged to implement P2P communication between devices or apparatuses, and in addition, the control apparatus 41 implements control over P2P communication, thereby adding a central control node on a basis of P2P communication. This ensures communication efficiency, and also takes control and scheduling requirements of the central control node on a system into account.

To implement the method described in the second embodiment of the present disclosure, the functional modules of the control apparatus shown in FIG. 10 need to complete the following functions:

The receiving unit 81 is configured to receive a resource publishing request from a publishing apparatus, where the resource publishing request includes information about a to-be-published resource, node identification information of the publishing apparatus, and node identification information of a first forwarding apparatus. The determining unit 82 is configured to determine path information of the publishing apparatus based on the node identification information of the first forwarding apparatus and the node identification information of the publishing apparatus in the resource publishing request. The storage unit 85 is configured to store the information about a to-be-published resource in a publishing apparatus node of a network resource tree. The receiving unit 81 is further configured to receive a resource subscription request, where the resource subscription request includes information about a to-be-subscribed resource, node identification information of a subscription apparatus, addressing information of the subscription apparatus, and node identification information of a second forwarding apparatus. The determining unit 82 is further configured to determine path information of the subscription apparatus based on the node identification information of the second forwarding apparatus and the node identification information of the subscription apparatus in the resource subscription request. The storage unit 85 is further configured to store the information about a to-be-subscribed resource and the addressing information of the subscription apparatus in a subscription apparatus node of the network resource tree. The matching unit 83 is configured to perform matching in the network resource tree based on the information about a to-be-subscribed resource. The sending unit 84 is configured to, after corresponding information about a to-be-published resource is found, send, by the transceiver, the addressing information of the subscription apparatus to a publishing apparatus corresponding to the information about a to-be-published resource.

An embodiment of the present disclosure further provides a computer storage medium, configured to store a computer software instruction used by the control apparatus shown in FIG. 10, and the computer storage medium includes a program designed for executing the second embodiment. Resource subscription may be implemented by executing the stored program.

The first embodiment and the second embodiment provided in the present disclosure are two different specific implementations of a same inventive concept. The solutions used in the two embodiments are both as follows: The information about a to-be-published resource of the publishing apparatus and the information about a to-be-subscribed resource of the subscription apparatus are reported to the control apparatus, and the control apparatus performs matching between a to-be-published resource and a to-be-subscribed resource based on a specific policy or rule, and sends information about the subscription apparatus to the publishing apparatus, so that the publishing apparatus directly sends a resource published by the publishing apparatus to the subscription apparatus. Such an inventive concept is used, so that global control of a control node in a system over the system is ensured, and P2P communication between the publishing apparatus and the subscription apparatus is also implemented. In this way, P2P communication is implemented under central control, and communication between apparatuses or nodes in the system are both controllable (the control apparatus controls a to-be-published resource and a to-be-subscribed resource) and efficient (P2P communication between the publishing apparatus and the subscription apparatus).

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with other hardware, or may be distributed in another form, for example, by using the Internet or another wired or wireless telecommunications system.

The present disclosure is described with reference to the flowcharts and/or block diagrams of the method, the apparatus (device), and the computer program product according to the embodiments of the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Although the present disclosure is described with reference to specific features and the embodiments thereof, obviously, various modifications and combinations may be made to them without departing from the embodiments of the present disclosure. Correspondingly, the specification and accompanying drawings are merely example descriptions of the present disclosure defined by the accompanying claims, and are considered as any of or all modifications, variations, combinations or equivalents that cover the scope of the present disclosure.

What is claimed is:

1. A resource subscription system, comprising:
    a publishing apparatus, configured to send a resource publishing request, wherein the resource publishing request comprises information about a to-be-published resource and node identification information of the publishing apparatus;
    a first forwarding apparatus, configured to: receive the resource publishing request from the publishing apparatus, add node identification information of the first forwarding apparatus to the resource publishing request, and send the resource publishing request to a control apparatus; and
    the control apparatus, configured to: receive the resource publishing request from the first forwarding apparatus, determine a path from the publishing apparatus to the control apparatus in a network resource tree based on the node identification information of the first forwarding apparatus and the node identification information of the publishing apparatus in the resource publishing request, and store the information about a to-be-published resource in a publishing apparatus node of the network resource tree.

2. The resource subscription system according to claim 1, further comprising:
    a subscription apparatus, configured to send a resource subscription request, wherein the resource subscription request comprises information about a to-be-subscribed resource, node identification information of the subscription apparatus, and addressing information of the subscription apparatus; and
    a second forwarding apparatus, configured to: receive the resource subscription request from the subscription apparatus, add node identification information of the second forwarding apparatus to the resource subscription request, and send the resource subscription request to the control apparatus,
    wherein the control apparatus is further configured to:
        receive the resource subscription request from the second forwarding apparatus;
        determine a path from the subscription apparatus to the control apparatus in the network resource tree based on the node identification information of the second forwarding apparatus and the node identification information of the subscription apparatus in the resource subscription request;
        store the information about the to-be-subscribed resource and the addressing information of the subscription apparatus in a subscription apparatus node of the network resource tree;
        perform matching in the network resource tree based on the information about the to-be-subscribed resource; and after corresponding information about the to-be-published resource is found by performing the matching, send the addressing information of the subscription apparatus to the publishing apparatus corresponding to the information about the to-be-published resource.

3. The resource subscription system according to claim 2, wherein the information about the to-be-subscribed resource comprises a resource identifier of the information about the to-be-subscribed resource; and
wherein the control apparatus is further configured to perform matching of a resource identifier of the information about the to-be-published resource in the network resource tree based on the resource identifier of the information about the to-be-subscribed resource.

4. The resource subscription system according to claim 2, wherein the information about the to-be-subscribed resource comprises node identification information of an apparatus; and
wherein the control apparatus is further configured to: perform matching in the network resource tree based on the node identification information of the apparatus, and when a node identifier of the first forwarding apparatus is found as a result of performing the matching, subscribe to a resource published by a publishing apparatus subordinate to the first forwarding apparatus.

5. The resource subscription system according to claim 2, wherein the information about the to-be-subscribed resource comprises a resource type; and
wherein the control apparatus is further configured to perform matching in the network resource tree based on the resource type to find a publishing apparatus node comprising the resource type.

6. The resource subscription system according to claim 2, wherein the control apparatus is further configured to:
find the information about the to-be-subscribed resource that matches the information about the to-be-published resource, so as to find the subscription apparatus node in the network resource tree;
store the addressing information of the subscription apparatus in the publishing apparatus node; and
send the addressing information of the subscription apparatus to the publishing apparatus, to involve the publishing apparatus in resource subscription of the subscription apparatus.

7. A resource subscription method, comprising:
sending, by a publishing apparatus, a resource publishing request, wherein the resource publishing request comprises information about a to-be-published resource and node identification information of the publishing apparatus;
receiving, by a first forwarding apparatus, the resource publishing request from the publishing apparatus, adding node identification information of the first forwarding apparatus to the resource publishing request, and sending the resource publishing request to a control apparatus;
receiving, by the control apparatus, the resource publishing request from the first forwarding apparatus, and determining a path from the publishing apparatus to the control apparatus in a network resource tree based on the node identification information of the first forwarding apparatus and the node identification information of the publishing apparatus in the resource publishing request; and storing, by the control apparatus, the information about a to-be-published resource in a publishing apparatus node of the network resource tree.

8. The resource subscription method according to claim 7, further comprising:
sending, by a subscription apparatus, a resource subscription request, wherein the resource subscription request comprises information about a to-be-subscribed resource, node identification information of the subscription apparatus, and addressing information of the subscription apparatus;
receiving, by a second forwarding apparatus, the resource subscription request from the subscription apparatus;
adding, by the second forwarding apparatus, node identification information of the second forwarding apparatus to the resource subscription request;
sending, by the second forwarding apparatus, the resource subscription request to the control apparatus;
receiving, by the control apparatus, the resource subscription request from the second forwarding apparatus;
determining, by the control apparatus, a path from the subscription apparatus to the control apparatus in the network resource tree based on the node identification information of the second forwarding apparatus and the node identification information of the subscription apparatus in the resource subscription request;
storing, by the control apparatus, the information about the to-be-subscribed resource and the addressing information of the subscription apparatus in a subscription apparatus node of the network resource tree;
performing, by the control apparatus, matching in the network resource tree based on the information about the to-be-subscribed resource; and
after corresponding information about the to-be-published resource is found by performing the matching, sending, by the control apparatus, the addressing information of the subscription apparatus to the publishing apparatus corresponding to the information about the to-be-published resource.

9. The resource subscription method according to claim 8, wherein the information about the to-be-subscribed resource comprises a resource identifier of the information about the to-be-subscribed resource; and
wherein the resource subscription method further comprises:
performing, by the control apparatus, matching of a resource identifier of the information about the to-be-published resource in the network resource tree based on the resource identifier of the information about the to-be-subscribed resource.

10. The resource subscription method according to claim 8, wherein the information about the to-be-subscribed resource comprises node identification information of an apparatus; and
wherein the resource subscription method further comprises:
performing, by the control apparatus, matching in the network resource tree based on the node identification information of the apparatus, and when a node identifier of the first forwarding apparatus is found as a result of performing the matching, subscribing to a resource published by a publishing apparatus subordinate to the first forwarding apparatus.

11. The resource subscription method according to claim 8,
wherein the information about the to-be-subscribed resource comprises a resource type; and
wherein the resource subscription method further comprises:
performing, by the control apparatus, matching in the network resource tree based on the resource type, to find a publishing apparatus node comprising the resource type.

12. The resource subscription method according to claim 8, further comprising:
finding, by the control apparatus, the information about the to-be-subscribed resource that matches the information about the to-be-published resource, so as to find the subscription apparatus node in the network resource tree;
storing, by the control apparatus, the addressing information of the subscription apparatus in the publishing apparatus node; and
sending, by the control apparatus, the addressing information of the subscription apparatus to the publishing apparatus, to involve the publishing apparatus in resource subscription of the subscription apparatus.

13. The resource subscription method according to claim 8, wherein:
the resource publishing request sent by the publishing apparatus further comprises node identification information of the control apparatus; and
the sending, by the first forwarding apparatus, the resource publishing request to the control apparatus comprises: sending, by the first forwarding apparatus, the resource publishing request to the control apparatus based on the node identification information of the control apparatus in the resource publishing request.

14. The resource subscription method according to claim 8, wherein:
the resource subscription request sent by the subscription apparatus further comprises node identification information of the control apparatus; and
the sending, by the second forwarding apparatus, the resource publishing request to the control apparatus comprises: sending, by the second forwarding apparatus, the resource subscription request to the control apparatus based on the node identification information of the control apparatus in the resource subscription request.

15. The resource subscription method according to claim 8, wherein the sending, by the second forwarding apparatus, the resource subscription request to the control apparatus comprises:
registering, by the second forwarding apparatus, with the control apparatus; and
sending, by the second forwarding apparatus, the resource subscription request to the control apparatus based on the registering with the control apparatus.

16. The resource subscription method according to claim 8, further comprising:
sending, by the control apparatus, the addressing information of the subscription apparatus to the publishing apparatus based on the path from the publishing apparatus to the control apparatus in the network resource tree.

17. The resource subscription method according to claim 8, further comprising:
discovering, by the publishing apparatus, the subscription apparatus by using a network autodiscovery process;
obtaining the addressing information of the subscription apparatus from the subscription apparatus by using the network autodiscovery process; and
when the addressing information obtained through the autodiscovery process is within a range of addressing information sent by the control apparatus, establishing, by the publishing apparatus, a connection to the subscription apparatus, and sending a resource to the subscription apparatus.

18. The resource subscription method according to claim 7, wherein the sending, by the first forwarding apparatus, the resource publishing request to the control apparatus comprises:
registering, by the first forwarding apparatus, with the control apparatus; and
sending, by the first forwarding apparatus, the resource publishing request to the control apparatus based on the registering with the control apparatus.

19. A control apparatus in a resource subscription system, wherein the resource subscription system comprises the control apparatus, a publishing apparatus, and a first forwarding apparatus, the control apparatus comprising:
a memory, configured to store a network resource tree;
a transceiver, configured to receive a resource publishing request from the first forwarding apparatus, wherein the resource publishing request comprises information about a to-be-published resource, node identification information of the publishing apparatus, and node identification information of the first forwarding apparatus; and
a processor, configured to: determine a path from the publishing apparatus to the control apparatus in the network resource tree based on the node identification information of the first forwarding apparatus and the node identification information of the publishing apparatus in the resource publishing request, and store the information about the to-be-published resource in a publishing apparatus node of the network resource tree.

20. The control apparatus according to claim 19, wherein the resource subscription system further comprises a subscription apparatus and a second forwarding apparatus, wherein:
the transceiver is further configured to receive a resource subscription request from the second forwarding apparatus, wherein the resource subscription request comprises information about a to-be-subscribed resource, node identification information of the subscription apparatus, addressing information of the subscription apparatus, and node identification information of the second forwarding apparatus;
the processor determines a path from the subscription apparatus to the control apparatus in the network resource tree based on the node identification information of the second forwarding apparatus and the node identification information of the subscription apparatus in the resource subscription request;
the processor stores the information about the to-be-subscribed resource and the addressing information of the subscription apparatus in a subscription apparatus node of the network resource tree;
the processor performs matching in the network resource tree based on the information about a to-be-subscribed resource; and
after corresponding information about a to-be-published resource is found by performing the matching, the transceiver sends the addressing information of the subscription apparatus to the publishing apparatus corresponding to the information about the to-be-published resource.

* * * * *